US010023725B2

(12) United States Patent
Condo et al.

(10) Patent No.: US 10,023,725 B2
(45) Date of Patent: *Jul. 17, 2018

(54) NANOCOMPOSITES CONTAINING NONSPHERICAL SILICA NANOPARTICLES, COMPOSITES, ARTICLES, AND METHODS OF MAKING SAME

(71) Applicant: 3M INNOVATIVE PROPERTIES COMPANY, St. Paul, MN (US)

(72) Inventors: Peter D. Condo, Lake Elmo, MN (US); Jeremy O. Swanson, Woodbury, MN (US); James E. Thorson, Hudson, WI (US); William J. Schultz, North Oaks, MN (US); Kristin L. Thunhorst, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/911,862

(22) PCT Filed: Aug. 12, 2014

(86) PCT No.: PCT/US2014/050659
§ 371 (c)(1),
(2) Date: Feb. 12, 2016

(87) PCT Pub. No.: WO2015/069347
PCT Pub. Date: May 14, 2015

(65) Prior Publication Data
US 2016/0194481 A1    Jul. 7, 2016

Related U.S. Application Data

(60) Provisional application No. 62/018,993, filed on Jun. 30, 2014, provisional application No. 61/918,302, filed on Dec. 19, 2013, provisional application No. 61/909,575, filed on Nov. 27, 2013, provisional application No. 61/865,308, filed on Aug. 13, 2013.

(51) Int. Cl.
| | |
|---|---|
| *C08K 9/04* | (2006.01) |
| *C09D 7/40* | (2018.01) |
| *C08J 5/24* | (2006.01) |
| *C09D 7/12* | (2006.01) |
| *C08K 9/06* | (2006.01) |
| *C08J 5/00* | (2006.01) |
| *C08K 7/00* | (2006.01) |
| *C08K 7/18* | (2006.01) |
| *C08K 7/28* | (2006.01) |
| *C08L 63/00* | (2006.01) |

(52) U.S. Cl.
CPC .............. *C08K 9/04* (2013.01); *C08J 5/005* (2013.01); *C08J 5/24* (2013.01); *C08K 7/00* (2013.01); *C08K 7/18* (2013.01); *C08K 7/28* (2013.01); *C08K 9/06* (2013.01); *C08L 63/00* (2013.01); *C09D 7/12* (2013.01); *C09D 7/40* (2018.01); *B05D 2601/02* (2013.01); *B05D 2601/22* (2013.01); *C08J 2333/08* (2013.01); *C08J 2333/24* (2013.01); *C08J 2363/00* (2013.01)

(58) Field of Classification Search
CPC ... C08K 7/00; C08K 7/18; C08K 7/28; C08K 9/04; C08K 9/06; C08J 5/005; C08J 5/24; C09D 7/12
USPC ........................................................ 524/493
See application file for complete search history.

(56) References Cited

U.S. PATENT DOCUMENTS

| | | | |
|---|---|---|---|
| 3,018,262 A | 1/1962 | Schroeder |
| 3,298,998 A | 1/1967 | McConnell |
| 3,562,223 A | 2/1971 | Bargain |
| 3,627,780 A | 12/1971 | Bonnard |
| 3,661,544 A | 5/1972 | Whitaker |
| 3,839,358 A | 10/1974 | Bargain |
| 4,100,140 A | 7/1978 | Zahir |

(Continued)

FOREIGN PATENT DOCUMENTS

| | | |
|---|---|---|
| CN | 1319737 | 10/2001 |
| CN | 101386700 | 3/2009 |

(Continued)

OTHER PUBLICATIONS

ASTM D2196-15, Standard Test Methods for Rheological Properties of Non-Newtonian Materials by Rotational Viscometer.

(Continued)

*Primary Examiner* — Edward J Cain
(74) *Attorney, Agent, or Firm* — Adrian L. Pishko

(57) ABSTRACT

A nanocomposite is provided including nonspherical silica nanoparticles dispersed in a curable resin or a curing agent, where the nanocomposite contains less than 2% by weight solvent. A composite is also provided including from about 4 to 70 weight percent of nonspherical silica nanoparticles dispersed in a cured resin, and a filler embedded in the cured resin. Further, a method of preparing a nanoparticle-containing curable resin system is provided including mixing from 10 to 70 weight percent of aggregated silica nanoparticles with a curable resin and optionally a dispersant, a catalyst, a diluent, a surface treatment agent, and/or a curing agent, to form a mixture. The mixture contains less than 2% by weight solvent. The method also includes milling the mixture in an immersion mill containing milling media to form a milled resin system including nonspherical silica nanoparticles dispersed in the curable resin.

17 Claims, 8 Drawing Sheets

(56) References Cited

U.S. PATENT DOCUMENTS

| | | | |
|---|---|---|---|
| 4,157,360 A | 6/1979 | Prevorsek | |
| 4,447,564 A | 5/1984 | Grimmer | |
| 4,468,497 A | 8/1984 | Street | |
| 4,522,958 A | 6/1985 | Das | |
| 4,624,971 A | 11/1986 | van Tao | |
| 4,842,837 A | 6/1989 | Shimizu | |
| 5,221,497 A | 6/1993 | Watanabe | |
| 5,648,407 A | 7/1997 | Goetz | |
| 5,717,009 A | 2/1998 | Matsushita et al. | |
| 5,733,644 A | 3/1998 | Tanaka et al. | |
| 6,703,116 B2 * | 3/2004 | Ohshima | C08J 5/042 198/619 |
| 7,175,118 B2 | 2/2007 | Hockmeyer | |
| 2006/0079623 A1 | 4/2006 | Chen | |
| 2007/0199477 A1 | 8/2007 | Hill | |
| 2007/0232727 A1 | 10/2007 | Lin | |
| 2008/0176987 A1 | 7/2008 | Trevet et al. | |
| 2008/0277814 A1 | 11/2008 | Moszner et al. | |
| 2009/0137706 A1 | 5/2009 | Healy | |
| 2009/0180976 A1 | 7/2009 | Seeney | |
| 2009/0318598 A1 | 12/2009 | Perez | |
| 2010/0152325 A1 | 6/2010 | Isayev et al. | |
| 2010/0283004 A1 | 11/2010 | Lee et al. | |
| 2011/0079668 A1 | 4/2011 | Nelson | |
| 2011/0097212 A1 | 4/2011 | Thompson et al. | |
| 2011/0189432 A1 | 8/2011 | Goto | |
| 2011/0245376 A1 | 10/2011 | Schultz | |
| 2011/0309074 A1 | 12/2011 | Thunhorst | |
| 2012/0059086 A1 | 3/2012 | Nelson et al. | |
| 2012/0071586 A1 | 3/2012 | Thunhorst | |
| 2012/0100770 A1 | 4/2012 | Fung | |
| 2012/0202918 A1 | 8/2012 | Singh et al. | |
| 2012/0214948 A1 | 8/2012 | Condo | |
| 2012/0244338 A1 | 9/2012 | Schultz | |
| 2013/0037310 A1 | 2/2013 | Kimura | |
| 2016/0194479 A1 | 7/2016 | Condo et al. | |
| 2016/0194480 A1 | 7/2016 | Condo et al. | |
| 2016/0200898 A1 | 7/2016 | Condo et al. | |

FOREIGN PATENT DOCUMENTS

| | | |
|---|---|---|
| CN | 102112536 | 6/2011 |
| CN | 102458646 | 5/2012 |
| CN | 102690496 | 9/2012 |
| EP | 2 490 983 | 8/2016 |
| JP | H0284400 | 3/1990 |
| JP | 2008-214568 | 9/2008 |
| WO | WO 2006-072069 | 7/2006 |
| WO | WO 2008-027979 | 3/2008 |
| WO | WO 2009-120846 | 10/2009 |
| WO | WO 2010-080459 | 7/2010 |
| WO | WO 2011-159521 | 12/2011 |
| WO | WO 2012-037265 | 3/2012 |
| WO | WO 2014-005753 | 1/2014 |
| WO | WO 2015-023640 | 2/2015 |
| WO | WO 2015-023642 | 2/2015 |
| WO | WO 2015-023718 | 2/2015 |

OTHER PUBLICATIONS

Lee, "Handbook of Epoxy Resins", McGraw Hill Book Co., 3Pgs. (1967).
May, "Epoxy Resins", Chemistry and Technology, 4Pgs. (1988).
Goodman, "Handbook of Thermoset Plastics", 11Pgs. (1998).
Melo, "High Energy Mill Processing of Polymer Based Nanocomposites", Journal of Composite Materials, 2008, vol. 42, No. 22, pp. 2363-2375.
Liu, "A Novel Approach of Chemical Functionalization on Nano-Scaled Silica Particles", Nanotechnology, 2003, vol. 14, pp. 813-819.
International Search Report for PCT International Application No. PCT/US2014/050659 dated Jul. 2, 2015, 4 pages.
Birdi, ed., Handbook of Surface and Colloid Chemistry, 4$^{th}$ ed., pp. 640-641 (2015).
Wang, et al., "Corrosion and Control of Tube," Northwestern Polytechnical University Press, Mar. 2013, pp. 137-138.

\* cited by examiner 500 nm 500 nm

- - - Example 10
-·-·- Example 7
·········· Comparative Example 7
——— Comparative Example 3

500 nm 500 nm 200 nm  *FIG. 4C*

— — Example 11
— - - Example 8
·········· Comparative Example 8
——— Comparative Example 4

NANOCOMPOSITES CONTAINING NONSPHERICAL SILICA NANOPARTICLES, COMPOSITES, ARTICLES, AND METHODS OF MAKING SAME

CROSS REFERENCE TO RELATED APPLICATIONS

This application is a national stage filing under 35 U.S.C. 371 of PCT/US2014/050659, filed Aug. 12, 2014, which claims priority to U.S. application Ser. No. 61/865,308, filed Aug. 13, 2013; U.S. application Ser. No. 61/909,575, filed Nov. 27, 2013; U.S. application Ser. No. 61/918,302, filed Dec. 19, 2013; and U.S. application Ser. No. 62/018,993, filed Jun. 30, 2014, the disclosures of which are incorporated by reference in their entirety herein.

TECHNICAL FIELD

The present disclosure relates to nanocomposites, composites, and articles that contain nonspherical silica nanoparticles, as well as methods of making the same.

BACKGROUND

A persistent issue for nanocomposites, and in turn composites that contain nanoparticles, is cost, including cost associated with the processing steps. One approach to processing nanocomposites is a solvent-based approach where an aqueous dispersion of nanoparticles is the raw material. The dispersion is typically dilute, in which the nanoparticles are present in an amount between about 15-40 weight percent. A solvent, typically a water-miscible solvent, is added in a 1:1 ratio with the water in the dispersion, further diluting the nanoparticles. The solvent is typically chosen so that the dispersed state of the nanoparticles is maintained. The solvent further serves to decrease the thickening effect of silica nanoparticles on resin systems. A surface treating agent is typically used to make the nanoparticles more compatible with the matrix resin. The surface treating agent is typically soluble in the water:solvent:nanoparticle dispersion. After completion of the surface treatment process, the modified nanoparticle dispersion is mixed with resin. This is followed by removal of the water and solvent to yield a nanocomposite.

Another approach to processing nanocomposites is the solvent-free approach where dry, aggregated particles are reduced in size, surface treated, and compounded into a resin by a mechanical grinding process (e.g., milling) without the aid of a solvent.

There is a cost associated with the processes of preparing the nanoparticle aqueous dispersion, addition of solvent, surface treatment of the nanoparticles, compounding the nanoparticles into a resin, and removal of the water and solvent to form the nanocomposite. The removal of water and solvent is typically the most expensive of these processes.

SUMMARY

The present disclosure provides nanocomposites and articles that contain nonspherical silica nanoparticles, and methods of making the nanocomposites and articles, which have decreased cost of materials and processing, as compared to other preparation approaches.

In a first embodiment, the present disclosure provides a nanocomposite including nonspherical silica nanoparticles dispersed in a curable resin, wherein the nanocomposite contains less than 2% by weight solvent.

In a second embodiment, the present disclosure provides a composite including from about 4 to 70 weight percent of nonspherical silica nanoparticles dispersed in a cured resin, and a filler embedded in the cured resin. The filler comprises at least one of a reinforcing continuous fiber, reinforcing discontinuous fibers, and hollow glass bubbles.

In a third embodiment, the present disclosure provides an article including a cured nanocomposite including from about 4 to about 70 weight percent of nonspherical silica nanoparticles dispersed in a cured resin, wherein the nonspherical silica nanoparticles comprise one or more irregular shapes.

In a fourth embodiment, the present disclosure provides a method of preparing a nanoparticle-containing curable resin system including mixing from 10 to 70 weight percent of aggregated silica nanoparticles with a curable resin and optionally a dispersant, a catalyst, a diluent, a surface treatment agent, and/or a curing agent, to form a mixture. The mixture contains less than 2% by weight solvent. The method further includes milling the mixture in a first immersion mill containing milling media to form a milled resin system comprising nonspherical silica nanoparticles dispersed in the curable resin.

In a fifth embodiment, the present disclosure provides a nanocomposite including nonspherical silica nanoparticles dispersed in a curing agent, wherein the nanocomposite contains less than 2% by weight solvent.

Various unexpected results and advantages are obtained in exemplary embodiments of the disclosure. One such advantage of exemplary embodiments of the present disclosure is the ability to produce low cost, high performance silica nanocomposites and articles. Another potential advantage of exemplary embodiments of the present disclosure is the ability to prepare dispersions of silica nanoparticles in curable resin at high loading amounts without the use of solvents.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the cited list serves only as a representative group and should not be interpreted as an exclusive list.

BRIEF DESCRIPTION OF THE DRAWINGS

FIG. 1 is a graph presenting the measured viscosity of each of Comparative Example 1, Example 1, Example 2, Example 3, Example 4, and Example 5a.

FIG. 4c is a TEM image of Example 8, having a higher magnification than the TEM image of FIG. 4b.

DETAILED DESCRIPTION

Figure 1:
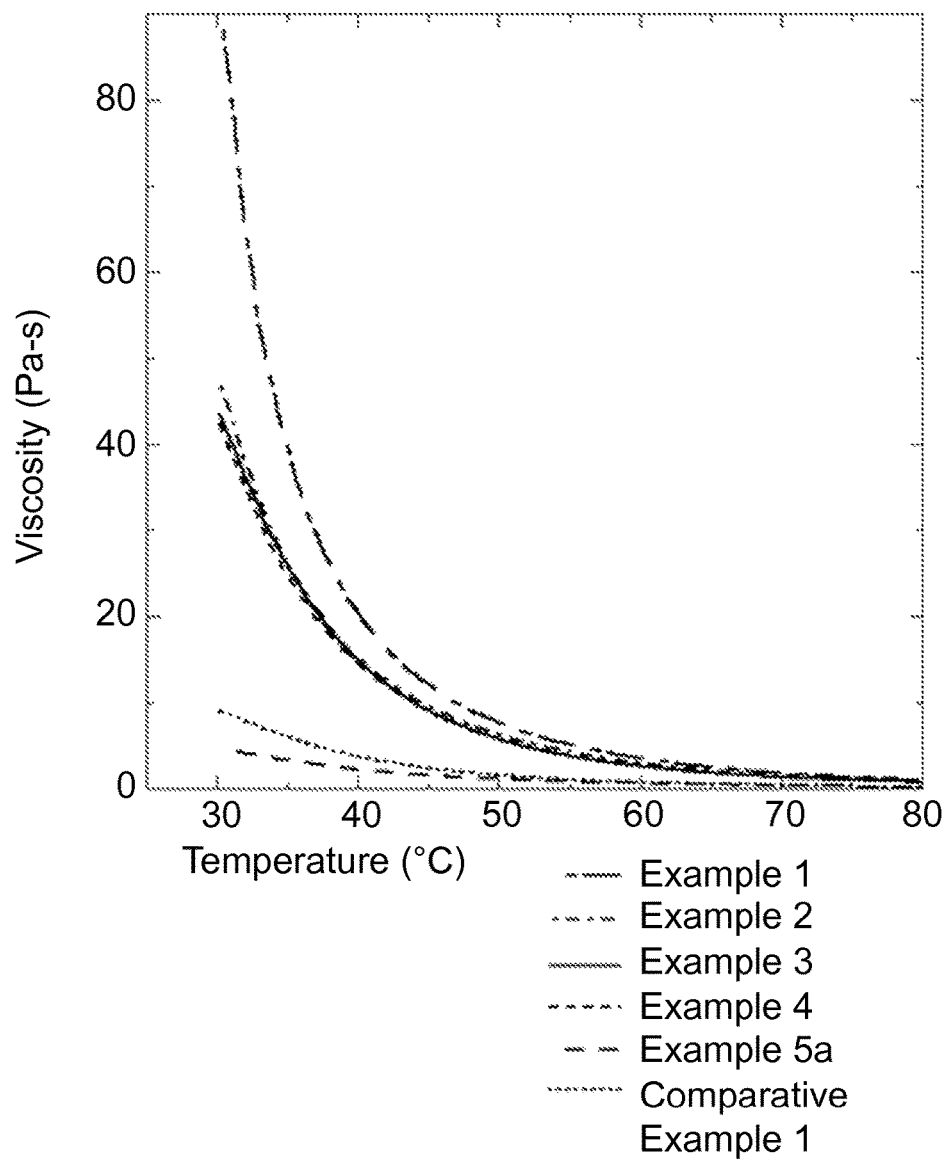

Nanocomposites, composites, and articles are provided that contain silica nanoparticles, as well as methods of making the nanocomposites, composites, and articles. There is a need for a more efficient process for the incorporation of silica nanoparticles into nanocomposites and articles.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. Thus, for example, reference to "a compound" includes a mixture of two or more compounds.

As used in this specification and the appended embodiments, the term "or" is generally employed in its sense including "and/or" unless the content clearly dictates otherwise. The term "and/or" means either or both. For example, the expression "A and/or B" means A, B, or a combination of A and B.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The term "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "nanoparticle" refers to particles that are submicron in size. The nanoparticles have an average particle size, which refers to the average longest dimension of the particles, that is no greater than 1000 nanometers, no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods (e.g., laser diffraction) can be used as well. The average particle size typically refers to the average size of non-agglomerated and/or non-aggregated single nanoparticles.

The term "agglomerated" refers to a weak association of primary particles usually held together by charge or polarity. Agglomerated particles can typically be broken down into smaller entities by, for example, shearing forces encountered during dispersion of the agglomerated particles in a liquid.

The terms "aggregated" and "aggregates" refer to a strong association of primary particles often bound together by, for example, residual chemical treatment, covalent chemical bonds, or ionic chemical bonds. Further breakdown of the aggregates into smaller entities is very difficult to achieve.

The term "nonspherical" means any shape other than essentially spherical, including for example and without limitation, cubic, pyramidal, oval, plate-like, conical, diamond shaped, and acicular, and including regular and/or irregular shapes. For instance, a shape that is at least partially spherical but has portions missing from the sphere is encompassed by the term nonspherical. The term "nonspherical" encompasses a population of clusters of spherical primary nanoparticles (e.g., an aggregate of spherical nanoparticles), wherein the cluster is defined to have any shape other than essentially spherical and is submicron in size. The population of clusters (i.e., the clusters within the population) has a mean size, which refers to the average longest dimension of the clusters of spherical primary nanoparticles, that is no greater than 1000 nanometers, no greater than 500 nanometers, no greater than 200 nanometers, no greater than 100 nanometers, no greater than 75 nanometers, no greater than 50 nanometers, or no greater than 40 nanometers. The term "acicular" encompasses shapes such as rods, ellipsoids, needles, and the like. Certain nonspherical shapes have an aspect ratio of at least 2:1, at least 3:1, at least 5:1, or at least 10:1. The term "aspect ratio" refers to the ratio of the average longest dimension (e.g., of a nanoparticle) to the average shortest dimension.

As used herein, the term "silica" refers to amorphous silicon dioxide ($SiO_2$).

As used herein, the term "silica nanoparticle" refers to a nanoparticle having a silica surface. This includes nanoparticles that are substantially, entirely silica, as well nanoparticles comprising other inorganic (e.g., metal oxide) or organic cores having a silica surface. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof.

The term "curable" as used herein means chemically or physically crosslinkable to form a glassy, insoluble, nonflowable network which is maintained under normal use conditions.

The term "cured" as used herein means chemically or physically crosslinked in the form of a glassy, insoluble, non-flowable network which is maintained under normal use conditions.

The term "resin" as used herein means one polymer or at least two polymers blended together, in either solid or molten form.

The term "matrix" as used herein in the term "matrix resin" refers to a curable or cured resin into which additional components may be included (e.g., particles, fibers, etc.).

The term "nanocomposite" as used herein refers to a material comprising a curable or cured resin and silica nanoparticles, which may or may not be cured.

The term "composite" as used herein refers to a cured nanocomposite comprising a cured resin, silica nanoparticles, and a filler comprising at least one of a continuous fiber, discontinuous fibers, and hollow glass bubbles. Continuous fibers include for example and without limitation, glass, carbon, basalt, ceramic (e.g., NEXTEL ceramic oxide fibers available from 3M Company (St. Paul, Minn.)), and organic fibers (e.g., aromatic polyamide (e.g., KEVLAR available from DuPont (Wilmington, Del.)), polypropylene, and polyacrylnitrile).

The term "article" as used herein refers to an object comprising a cured nanocomposite comprising a cured resin and silica nanoparticles, and optionally a filler comprising at least one of a reinforcing continuous fiber, reinforcing discontinuous fibers, and hollow glass bubbles (i.e., a composite).

The term "neat" as used herein in the term "neat resin" refers to a curable or cured resin which does not include a macroscopic filler (e.g., continuous or discontinuous fibers, hollow glass bubbles, etc.).

The term "(co)polymer" is inclusive of both homopolymers containing a single monomer and copolymers containing two or more different monomers.

The term "(meth)acrylic" or "(meth)acrylate" is inclusive of both acrylic and methacrylic (or acrylate and methacrylate).

The term "aliphatic group" means a saturated or unsaturated linear or branched hydrocarbon group. This term is used to encompass alkyl, alkenyl, and alkynyl groups, for example.

The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" refers to a divalent alkyl group.

The term "heteroalkyl group" means an alkyl group having at least one —$CH_2$— replaced with a heteroatom such as O or S. In many embodiments, the heteroalkyl group is a monovalent polyether group. The term "heteroalkylene group" refers to a divalent heteroalkyl group. In many embodiments, the heteroalkylene group is a divalent polyether group.

The term "alicyclic group" means a cyclic hydrocarbon group having properties resembling those of aliphatic groups. The term "aromatic group" or "aryl group" means a mono- or polynuclear aromatic hydrocarbon group.

The term "unsaturation" means either a double bond between two atoms (e.g., C═C), or a triple bond between two atoms (e.g., C≡C).

When a group is present more than once in a formula described herein, each group is "independently" selected, whether specifically stated or not. For example, when more than one R group is present in a formula, each R group is independently selected.

The term "component" refers to any compound (e.g., any reactant), heterogeneous catalyst, solvent, or other material, which is present in a reactor.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Thus, in a first exemplary embodiment, the disclosure provides a nanocomposite comprising nonspherical silica nanoparticles dispersed in a curable resin, wherein the nanocomposite comprises less than 2% by weight solvent. Preferably, the nanocomposite comprises less than 0.5% by weight solvent, or even more preferably the nanocomposite comprises essentially no solvent.

In a second exemplary embodiment, a composite is provided comprising from about 4 to 70 weight percent of nonspherical silica nanoparticles dispersed in a cured resin, and a filler embedded in the cured resin. The filler comprises at least one of a reinforcing continuous fiber, reinforcing discontinuous fibers, and hollow glass bubbles. In certain embodiments, an article is provided comprising the composite.

Accordingly, in a third exemplary embodiment, an article is provided comprising a nanocomposite comprising from about 4 to about 70 weight percent of nonspherical silica nanoparticles dispersed in a cured resin. In certain aspects, the article contains from about 10 to about 30 weight percent, or from about 10 to about 70 weight percent, or from about 15 to about 30 weight percent, or from about 15 to about 50 weight percent, or from about 20 to about 50 weight percent, or from about 25 to about 50 weight percent, or from about 15 to about 70 weight percent, or from about 25 to about 70 weight percent, or from about 35 to about 70 weight percent, or from about 50 to about 70 weight percent of the nonspherical silica nanoparticles. In many embodiments, the article comprises nonspherical silica nanoparticles comprising one or more irregular shapes.

In certain embodiments, the nanocomposite or article further comprises one or more additional components (e.g., additives), for example and without limitation, dispersants, catalysts, surface treatment agents, reactive diluents, curing agents, cure accelerators, defoamers, air release agents, crosslinking agents, dyes, flame retardants, pigments, impact modifiers, and flow control agents.

Nonspherical silica nanoparticles often have an average width (smallest dimension) equal to at least 1 nanometer, at least 2 nanometers, or at least 5 nanometers. The average width of nonspherical silica nanoparticles is often no greater than 250 nanometers, no greater than 100 nanometers, or no greater than 50 nanometers. The nonspherical silica nanoparticles can have an average length D1 measured by dynamic light scattering methods that is, for example, at least 25 nanometers, at least 50 nanometers, at least 75 nanometers, or at least 100 nanometers. The average length D1 (e.g., longer dimension) can be up to 200 nanometers, up to 400 nanometers, or up to 500 nanometers. Acicular nonspherical silica particles may have an elongation ratio D1/D2 in a range of 5 to 30, wherein D2 means a diameter in nanometers calculated by the equation D2=2720/S and S means specific surface area in meters squared per gram ($m^2$/gram) of the nanoparticle, as described in U.S. Pat. No. 5,221,497 (Watanabe et al.).

In certain embodiments, the nonspherical silica nanoparticles comprise a population of clusters of primary spherical silica nanoparticles. The population of clusters of primary spherical silica nanoparticles comprises a mean (i.e., average) size of the longest dimension in the range from 40 to 900 nanometers, or from 40 to 700 nanometers, or from 40 to 500 nanometers, or from 40 to 250 nanometers, or from 40 to 150 nanometers, or from 500 to 900 nanometers, or from 250 to 500 nanometers, or from 400 to 600 nanometers, or from 100 to 300 nanometers. In such embodiments, the primary spherical silica nanoparticles comprise a particle diameter in the range from 1 to 100 nanometers, or from 1 to 50 nanometers, or from 1 to 25 nanometers, or from 75 to 100 nanometers, or from 50 to 100 nanometers, or from 25 to 75 nanometers.

In certain embodiments, the nonspherical silica nanoparticles are selected to have an average specific surface area equal to at least 25 $m^2$/gram, at least 50 $m^2$/gram, at least 100 $m^2$/gram, at least 150 $m^2$/gram, at least 200 $m^2$/gram, at least 250 $m^2$/gram, at least 300 $m^2$/gram, or at least 400 $m^2$/gram. Nonspherical nanoparticles having average specific surface areas equal to at least 150 $m^2$/gram often have an average diameter (i.e., longest dimension) less than 40 nanometers, less than 30 nanometers, less than 25 nanometers, or less than 20 nanometers.

Various sizes and/or various shapes of silica nanoparticles may be used in combination. In certain embodiments, bimodal distributions of particle sizes may be used. For example, nanoparticles having an average particle size (i.e., of the diameter or of the longest dimension) of at least 50 nanometers (e.g., in the range of 50 to 200 nanometers or in the range of 50 to 100 nanometers) can be used in combination with nanoparticles having an average diameter no greater than 40 nanometers. The weight ratio of the larger to smaller nanoparticles can be in the range of 2:98 to 98:2, in the range of 5:95 to 95:5, in the range of 10:90 to 90:10, or in the range of 20:80 to 80:20. Nanocomposites having a bimodal distribution of silica nanoparticles can include 2 to 20 weight percent silica nanoparticles having an average particle size of 40 nanometers or less and 2 to 40 weight percent silica nanoparticles having an average particle size of 50 nanometers or greater. The amount is based on a total weight of the nanocomposite. In an aspect, the nonspherical silica nanoparticles comprise a bimodal particle size distribution. In another aspect, the nonspherical silica nanoparticles comprise a unimodal particle size distribution. The nonspherical silica nanoparticles typically comprise an average particle size of the longest dimension in the range from about 1 nanometer to about 1000 nanometers, or from about 1 nanometer to about 500 nanometers, or from about 1 nanometer to about 100 nanometers, or from about 1 nanometer to about 50 nanometers, or from about 100 nanometers to about 400 nanometers, or from about 500 nanometers to about 1000 nanometers.

In some embodiments, the silica nanoparticle cores have a narrow particle size distribution. In some embodiments, the core is substantially fully condensed. In some embodiments, the core is amorphous. In some embodiments, the core is isotropic. In some embodiments, the silica nanoparticles are substantially non-agglomerated.

The silica particles to be included in a nanocomposite are typically commercially available in the form of a silica microparticle powder. Example precipitated silica powder is available under the trade designations TIXOSIL (e.g., TIXOSIL 68) from Rhodia (Bristol, Pa.), SIPERNAT (e.g., SIPERNAT 33) from Evonik Degussa Corporation (Parsippany, N.Y., USA), ZEOFREE (e.g., ZEOFREE 80) from Huber Engineered Materials (Atlanta, Ga., USA), HI-SIL (e.g., HI-SIL T-800) from PPG Industries (Pittsburgh, Pa.), and SYLOID (e.g., SYLOID 244) from W.R. Grace and Company (Columbia, Md., USA). Example fumed silica powder is available under the trade designation ORISIL 200 from Orisil (Lviv, Ukraine), AEROSIL (e.g., AEROSIL 200) from Evonik Degussa Corporation (Parsippany, N.Y., USA), HDK (e.g., HDK N20) from Wacker Chemical Corporation (Adrian, Mich.), CABOSIL (e.g., CABOSIL HP-60) from Cabot Corporation (Billerica, Mass.), KONASIL (e.g., KONASIL K-200) from Keysu Industrial Company, Limited (Seoul, Korea), REOLOSIL from Tokuyama Corporation (Tokyo, Japan), and XYSIL (e.g., XYSIL 200) from Xunyu Chemical Company, Limited (Zhengshou City, China).

In certain embodiments, the nanocomposite or article comprises from about 4 to about 70 weight percent of the nonspherical silica nanoparticles, or from about 6 to about 30 weight percent, or from about 10 to about 30 weight percent, or from about 10 to about 50 weight percent, or from about 10 to about 70 weight percent, or from about 15 to about 30 weight percent, or from about 15 to about 50 weight percent, or from about 20 to about 50 weight percent, or from about 25 to about 50 weight percent, or from about 15 to about 70 weight percent, or from about 25 to about 70 weight percent, or from about 35 to about 70 weight percent, or from about 50 to about 70 weight percent of the nonspherical silica nanoparticles. In an aspect, the nanocomposite consists essentially of the nonspherical silica nanoparticles dispersed in the curable resin. In an aspect, the article consists essentially of the nonspherical silica nanoparticles dispersed in the cured resin.

Nanoparticles, including surface-modified nanoparticles, have been compounded into curable resins to alter the properties of the resulting cured resin system. For example, U.S. Pat. No. 5,648,407 (Goetz et al.) describes, among other things, curable resins comprising colloidal microparticles in curable resin, and the use of such particle-containing resins in combination with reinforcing fibers. International Patent Publication No. WO2008/027979 (Goenner et al.) describes, among other things, resin systems comprising one or more crosslinkable resins, one or more reactive diluents, and a plurality of reactive, surface-modified nanoparticles.

Traditionally, nanoparticles have been compounded into resins using a combination of solvent exchange and solvent stripping processes. In addition to being time-consuming and requiring the use of multiple solvents, such processes often expose the curable resins to high temperatures. Such high temperatures can lead to oligomerization and other undesirable reactions during the compounding process with a resultant increase in viscosity. In addition, low-boiling-temperature components (e.g., volatile reactive diluents) may be lost during these compounding steps.

Moreover, prior to solvent stripping, silica nanoparticle dispersions typically contain only about 20% by weight nanoparticles, thus to make a concentrated (e.g., 50 wt. %) nanocomposite is difficult, particularly when employing a batch process requiring a large volume stripping unit to contain the feed, 80 vol. % of which is waste (e.g., water and solvent).

The present disclosure provides alternative procedures for combining nanoparticles, including agglomerated nanoparticles, into a curable resin. These procedures do not require the use of solvents and may be used to compound curable resins without causing premature cure.

Silica particles are typically included in resin systems as thickeners; generally, the smaller the particle size, the greater the increase in viscosity of the silica particle-containing resin. Such thickening effects can be observed at silica particle loadings of as little as 3 weight percent (wt. %), 2 wt. %, or even 1 wt. %. Typically, a loading of about 10 weight percent or more silica microparticles or silica nanoparticles in resin poses challenges with respect to effective dispersion of the particles within the resin. For example, high resin system viscosities (e.g., greater than about 1,000 centipoises (cP), or greater than about 5,000 cP) inhibits dispersion of silica particles into a resin system according to usual methods. In contrast to prior systems, embodiments of the nanocomposites, articles, and methods of the present disclosure achieve dispersion of silica particles at high loadings (e.g., at least 4 wt. %, at least 6 wt. %, at least 8 wt. %, at least 10 wt. %, at least 12 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, at least 60 wt. %, or at least 65 wt. %) without requiring the use of solvents to decrease the viscosity of the resin system. Similarly, embodiments of the nanocomposites, articles, and methods of the present disclosure achieve dispersion of silica particles at high loadings without requiring a pretreatment of the silica particles with surface treatment agents to improve the compatibility of the silica particles with the specific resin(s) of the resin system.

Generally, curable resin systems are used in a wide variety of applications, e.g., as a protective layer (e.g., gel coats) and as the impregnation resin in composites. Advanced structural composites, for example, are high modulus, high strength materials useful in many applications requiring high strength to weight ratios, e.g., applications in the automotive, sporting goods, and aerospace industries. Exemplary composites include for example and without limitation, a turbine blade, golf club, a baseball bat, a fishing rod, a racquet, a bicycle frame, a pressure vessel (e.g., a container having pressurized contents), an aerospace part (e.g., an exterior panel of an airplane), and a cable (e.g., a hoist cable, an underwater tether, an umbilical cable, and the like). Such composites typically comprise reinforcing fibers (e.g., carbon or glass) embedded in a cured matrix resin. Resin systems are often selected based on the desired mechanical properties of the final product including, e.g., hardness, toughness, fracture resistance, and the like. In some applications, the optical appearance of the finished product may be important such that properties like clarity and haze must be considered. In addition, process conditions may lead to preferred ranges for properties such as viscosity. Finally, the desired end use of the product often leads to additional requirements, e.g., erosion resistance or anti-blistering.

Curable resins suitable for use in the nanocomposites of the invention are those resins, e.g., thermosetting resins and radiation-curable resins, which are capable of being cured to form a glassy network polymer. Suitable resins include, e.g., epoxy resins, curable imide resins (especially maleimide resins, but also including, e.g., commercial K-3 polyimides (available from DuPont) and polyimides having a terminal reactive group such as acetylene, diacetylene, phenylethynyl, norbornene, nadimide, or benzocyclobutane), vinyl ester resins and acrylic resins (e.g., (meth)acrylic esters or amides of polyols, epoxies, and amines), bisbenzocyclobutane resins, polycyanate ester resins, and mixtures thereof. The resins can be utilized in the form of either monomers or prepolymers. Preferred curable resins include epoxy resins, maleimide resins, polycyanate ester resins, and mixtures thereof. Epoxy resins are especially preferred due to their processing characteristics, high temperature properties, and environmental resistance.

Epoxy resins are well-known in the art and comprise compounds or mixtures of compounds which contain one or more epoxy groups of the structure

The compounds can be saturated or unsaturated, aliphatic, alicyclic, aromatic, or heterocyclic, or can comprise combinations thereof. Compounds which contain more than one epoxy group (i.e., polyepoxides) are preferred.

Polyepoxides which can be utilized in the nanocomposites of the invention include, e.g., both aliphatic and aromatic polyepoxides, but aromatic polyepoxides are preferred for high temperature applications. The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. The most preferred aromatic polyepoxides are the polyglycidyl ethers of polyhydric phenols.

Representative examples of aliphatic polyepoxides which can be utilized in the nanocomposites of the invention include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the nanocomposites of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxy)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schoeder) and U.S. Pat. No. 3,298,998 (Coover et al.), the descriptions of which are incorporated herein by reference, as well as the derivatives described in the Handbook of Epoxy Resins by Lee and Neville, McGraw-Hill Book Co., New York (1967) and in Epoxy Resins, Chemistry and Technology, Second Edition, edited by C. May, Marcel Dekker, Inc., New York (1988), and mixtures thereof. A preferred class of polyglycidyl ethers of polyhydric phenols for use in the nanocomposites of the invention is the diglycidyl ethers of bisphenol that have pendant carbocyclic groups, e.g., those described in U.S. Pat. No. 3,298,998 (Coover et al.), the description of which is incorporated herein by reference. Examples of such compounds include 2,2-bis[4-(2,3-epoxypropoxy)phenyl]norcamphane and 2,2-bis[4-(2,3-epoxypropoxy)phenyl]decahydro-1,4,5,8-dimethanonaphthalene. A preferred compound is 9,9-bis[4-(2,3-epoxypropoxy)phenyl]fluorene.

Suitable epoxy resins can be prepared by, e.g., the reaction of epichlorohydrin with a polyol, as described, e.g., in U.S. Pat. No. 4,522,958 (Das et al.), the description of which is incorporated herein by reference, as well as by other methods described by Lee and Neville and by May, supra. Many epoxy resins are also commercially available.

Maleimide resins suitable for use in the nanocomposites of the invention include bismaleimides, polymaleimides, and polyaminobismaleimides. Such maleimides can be conveniently synthesized by combining maleic anhydride or substituted maleic anhydrides with di- or polyamine(s). Preferred are N,N'-bismaleimides, which can be prepared, e.g., by the methods described in U.S. Pat. No. 3,562,223 (Bargain et al.), U.S. Pat. No. 3,627,780 (Bonnard et al.), U.S. Pat. No. 3,839,358 (Bargain), and U.S. Pat. No. 4,468,497 (Beckley et al.) (the descriptions of which are incorporated herein by reference) and many of which are commercially available.

Representative examples of suitable N,N'-bismaleimides include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

Co-reactants for use with the bismaleimides can include any of a wide variety of unsaturated organic compounds, particularly those having multiple unsaturation, either ethylenic, acetylenic, or both. Examples include acrylic acids and amides and the ester derivatives thereof, e.g., acrylic acid, methacrylic acid, acrylamide, methacrylamide, and methylmethacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; .alpha.-methyl styrene; chlorostyrene; p-phenylstyrene; p-methylstyrene; t-butylstyrene; and phenyl vinyl ether. Of particular interest are resin systems employing a bismaleimide in combination with a bis(alkenylphenol). Descriptions of a typical resin system of this type are found in U.S. Pat. No. 4,100,140 (Zahir et al.), the descriptions of which are incorporated herein by reference. Particularly preferred components are 4,4'-bismaleimidodiphenylmethane and o,o'-diallylbisphenol A.

Polycyanate ester resins suitable for use in the nanocomposites of the invention can be prepared by combining cyanogen chloride or bromide with an alcohol or phenol. The preparation of such resins and their use in polycyclotrimerization to produce polycyanurates are described in U.S. Pat. No. 4,157,360 (Chung et al.), the descriptions of which are incorporated herein by reference. Representative examples of suitable polycyanate ester resins include 1,2-dicyanatobenzene, 1,3-dicyanatobenzene, 1,4-dicyanatobenzene, 2,2'-dicyanatodiphenylmethane, 3,3'-dicyanatodiphenylmethane, 4,4'-dicyanatodiphenylmethane, and the dicyanates prepared from biphenol A, bisphenol F, and bisphenol S. Tri- and higher functionality cyanate resins are also suitable.

In some embodiments, the curable resin may be an ethylenically-unsaturated curable resin. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins are used. As used herein, the term "vinyl ester" refers to the reaction product of epoxy resins with ethylenically-unsaturated monocarboxylic acids. Exemplary epoxy resins include bisphenol A digycidyl ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane (meth)acrylates, polyethyleneglycol (multi)(meth)acrylates, and epoxy (multi)(meth)acrylates may be used. In other embodiments, direct milling into epoxy resins may be achieved. Epoxy resins may contain diluents such as hexanedioldiglycidyl ether.

Depending on the selection of the curable resin, in some embodiments, the resin system may also include a reactive diluent. Exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates.

In certain embodiments of the nanocomposite, the curable resin comprises an epoxy resin, a curable imide resin, a vinyl ester resin, an acrylic resin, a bisbenzocyclobutane resin, a polycyanate ester resin, or a mixture thereof. In an embodiment, the curable resin comprises an epoxy resin, a maleimide resin, a polycyanate ester resin, or a mixture thereof. In an embodiment, the curable resin comprises an epoxy resin or a mixture of epoxy resins. In an embodiment, the curable resin comprises a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

Similarly, in certain embodiments of the article, the cured resin comprises an epoxy resin, a cured imide resin, a vinyl ester resin, an acrylic resin, a bisbenzocyclobutane resin, a polycyanate ester resin, or a mixture thereof. Such resins are discussed in detail above. In an embodiment, the cured resin comprises an epoxy resin, a maleimide resin, a polycyanate ester resin, or a mixture thereof. In an embodiment, the cured resin comprises an epoxy resin or a mixture of epoxy resins. In an embodiment, the cured resin comprises a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

In an embodiment, the nanocomposite or article includes one or more dispersants. Suitable dispersants include for example and without limitation, a copolymer comprising acidic groups, for instance, a phosphoric acid polyester dispersant (e.g. BYK W9010) and BYK 2152, which is a hyperbranched high molecular weight polyester dispersant commercially available from BYK USA, Inc. (Wallingford, Conn.). Another suitable dispersant is a Jeffamine sulfonate, the sulfonic acid ligand containing JEFFAMINE M-6000 (commercially available from Huntsman Corporation, (The Woodlands, Tex.)) reacted with propane sulfone, as described in International Patent Publication No. WO 2010/080459 (Schultz et al.). The polymeric dispersants are added to the nanocomposite at the same time as the aggregated silica nanoparticles and curable resin. Typical high molecular weight dispersants are polymeric and have weight average molecular weights (Mw) of greater than 1000 gm/mole, or even greater than 2000 gm/mole. In certain embodiments, the dispersant is crosslinkable.

In an embodiment, the nanocomposite or article includes one or more catalysts for reacting silanol groups on the surface of the silica nanoparticles with the curable resin system. Suitable catalysts include for instance stannous chloride ($SnCl_2$) and methylethylketone peroxide.

In an embodiment, the nanocomposite or article includes one or more defoamers for acting as a defoamer and/or as an entrapped air release agent. Suitable defoamers include for instance BYK-1790 and BYK-A535, silicone-free polymeric defoamers, and BYK-A500 air release additives, commercially available from BYK USA, Inc. (Wallingford, Conn.).

Generally, "surface modified nanoparticles" comprise surface treatment agents attached to the surface of a nanoparticle. Advantageously, according to methods of the present disclosure, it is not necessary to modify the surface of silica nanoparticles in a separate step, prior to incorporating the nanoparticles into the nanocomposite. Surface treatment agents can simply be added to the nanocomposite and mixed in with the curable resin and silica nanoparticles, treating the surfaces of the silica nanoparticles during the dispersion of the silica nanoparticles in the curable resin.

In many embodiments, a surface treatment agent is an organic species having a first functional group capable of chemically attaching (e.g., covalently or ionically bonding) or physically attaching (e.g., strong physisorptively attaching) to the surface of a nanoparticle, wherein the attached surface treatment agent alters one or more properties of the nanoparticle. In some embodiments, covalently-bonded surface treatment agents may be preferred. In some embodiments, surface treatment agents have no more than three functional groups for attaching to the core. In some embodiments, the surface treatment agents have a low molecular weight, e.g. a weight average molecular weight less than 1000 grams per mole. In some embodiments, the surface treatment agent is an organosilane (e.g., alkyl chlorosilanes, trialkoxy arylsilanes, or trialkoxy alkylsilanes) or a compound having oxirane groups. Exemplary surface treatment agents include methacryloxypropyltrimethoxysilane, phenyl trimethoxysilane, 3-(trimethoxysilyl)propyl methacrylate) polyethyleneglycol(trimethoxy)silane benzooxasilepin dimethyl ester, phenethyltrimethoxysilane, N-phenylaminopropyl trimethoxysilane, diglycidylether of bisphenol-A, glycidylmethacrylate, allylglycidylether, or combinations thereof.

In some embodiments, the surface treatment agent further includes one or more additional functional groups providing one or more additional desired properties. For example, in some embodiments, an additional functional group may be selected to provide a desired degree of compatibility between the surface modified nanoparticles and one or more of the additional constituents of the resin system, e.g., one or more of the curable resins and/or diluents. In some embodiments, an additional functional group may be selected to modify the rheology of the resin system, e.g., to increase or decrease the viscosity, or to provide non-Newtonian rheological behavior, e.g., thixotropy (shear-thinning) In an embodiment, the nonspherical silica nanoparticles comprise treated surfaces, for example silica nanoparticle surfaces treated with an organosilane, a monohydric alcohol, or a polyol.

In some embodiments, the surface-modified nanoparticles are reactive; that is, at least one of the surface treatment agents used to surface modify the nanoparticles of the present disclosure may include a second functional group capable of reacting with one or more of the curable resin(s) and/or one or more reactive diluent(s) present in the nanocomposite.

In an embodiment, the nanocomposite or article includes at least one diluent, including at least one reactive diluent. Suitable diluents include, a polyfunctional glycidyl ether, styrene, mono- and multi-functional (meth)acrylates, or combinations thereof. Some exemplary suitable diluents include for example and without limitation dicyclopentenyloxyethyl methacrylate, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate. Other suitable reactive diluents for epoxy resins include for example mono- and multi-functional, aliphatic and aromatic, glycidyl ethers including, e.g., some of those available under the trade name HELOXY from Hexion Specialty Chemicals, Columbus, Ohio. Exemplary reactive diluents include, e.g., polypropylene glycol diglycidyl ether, allyl glycidyl ether, trimethylol propane trigylcidyl ether, 1,4-butane diol diglycidyl ether, neopentyl glycol diglycidyl ether, n-butyl glycidyl ether, 2-ethylhexyl glycidyl ether, p-tertiary butyl phenyl glycidyl ether, phenyl glycidyl ether, and cyclohexane dimethanol diglycidyl ether.

In certain embodiments, the nanocomposite or article includes a curing agent comprising an amine curing agent, an anhydride curing agent, a dicyandiamide curing agent, or a combination thereof. The term "curative" as used herein also refers to a curing agent. More particularly, in an aspect, the curing agent comprises an amine curing agent. In an aspect, the curing agent comprises an anhydride curing agent. In an aspect, the curing agent comprises a dicyandiamide curing agent. In an aspect, the curing agent comprises a mixed curing agent.

Epoxy resins can be cured by a variety of curing agents, some of which are described (along with a method for calculating the amounts to be used) by Lee and Neville in Handbook of Epoxy Resins, McGraw-Hill, pages 36-140, New York (1967). Useful epoxy resin curing agents include polyamines such as ethylenediamine, diethylenetriamine, aminoethylethanolamine, and the like, diaminodiphenylsulfone, 9,9-bis(4-aminophenyl)fluorene, 9,9-bis(3-chloro-4-(aminophenyl)fluorene, amides such as dicyandiamide, polycarboxylic acids such as adipic acid, acid anhydrides such as phthalic anhydride and chlorendic anhydride, and polyphenols such as bisphenol A, and the like. Generally, the epoxy resin and curing agent are used in stoichiometric amounts, but the curing agent can be used in amounts ranging from about 0.1 to 1.7 times the stoichiometric amount of epoxy resin.

Thermally-activated catalytic agents, e.g., Lewis acids and bases, tertiary amines, imidazoles, complexed Lewis acids, and organometallic compounds and salts, can also be utilized in curing epoxy resins. Thermally-activated catalysts can generally be used in amounts ranging from about 0.05 to about 5 percent by weight, based on the amount of epoxy resin present in the curable resin nanocomposite.

N,N'-bismaleimide resins can be cured using diamine curing agents, such as those described in U.S. Pat. No. 3,562,223 (Bargain et al.), the description of which is incorporated herein by reference. Generally, from about 0.2 to about 0.8 moles of diamine can be used per mole of N,N'-bismaleimide. N,N'-bismaleimides can also cure by other mechanisms, e.g., co-cure with aromatic olefins (such as bis-allylphenyl ether, 4,4'-bis(o-propenylphenoxy)benzophenone, or o,o'-diallylbisphenol A) or thermal cure via a self-polymerization mechanism.

Polycyanate resins can be cyclotrimerized by application of heat and/or by using catalysts such as zinc octoate, tin octoate, zinc stearate, tin stearate, copper acetylacetonate, and chelates of iron, cobalt, zinc, copper, manganese, and titanium with bidentate ligands such as catechol. Such catalysts can generally be used in amounts of from about 0.001 to about 10 parts by weight per 100 parts of polycyanate ester resin.

In certain embodiments, the nanocomposite or article further comprises reinforcing fibers, and optionally the reinforcing fibers are continuous. Suitable reinforcing fibers include for example and without limitation, carbon, glass, ceramic, boron, silicon carbide, polyimide, polyamide, polyethylene, or a combination thereof. In an embodiment, the reinforcing fibers comprise a unidirectional array of individual continuous fibers, woven fabric, knitted fabric, yarn, roving, braided constructions, or non-woven mat.

Advantageously, the nanocomposite is suitable for use in a prepreg, which includes any reinforcing or molding material that can be impregnated with the nanocomposite. In an embodiment, a prepreg includes the nanocomposite of any of the aspects or embodiments disclosed above. The curable nanocomposites of the invention can be used to make composite articles by a variety of conventional processes, e.g., resin transfer molding, filament winding, tow placement, resin infusion processes, compression sheet molding, or traditional prepreg processes. Prepregs can be prepared by impregnating an array of fibers (or a fabric) with the nanocomposite and then layering the impregnated tape or fabric. The resulting prepreg can then be cured by application of heat, along with the application of pressure or vacuum (or both) to remove any trapped air.

The nanocomposites can also be used to make composite parts by a resin transfer molding process, which is widely used to prepare composite parts for the aerospace and automotive industries. In this process, fibers are first shaped into a preform which is then compressed to final part shape in a metal mold. The nanocomposite can then be deposited into the mold and heat-cured.

Composites can also be prepared from the nanocomposites by a filament winding process, which is typically used to prepare cylinders or other composites having a circular or oval cross-sectional shape. In this process, a fiber tow or an array of tows is impregnated with the nanocomposite by running it through a resin bath (preferably, containing a low viscosity resin) and immediately winding the impregnated tow onto a mandrel. The resulting composite can then be heat-cured.

A pultrusion process (a continuous process used to prepare constant cross-section parts) can also be used to make composites from the curable resin sols. In such a process, a large array of continuous fibers is first wetted out in a resin bath (preferably, containing a low viscosity resin). The resulting wet array is then pulled through a heated die, where trapped air is squeezed out and the resin is cured.

In a further exemplary embodiment, a method is provided of preparing a nanoparticle-containing curable resin system. The method comprises mixing from 10 to 70 weight percent of aggregated silica nanoparticles with a curable resin and optionally a dispersant, a catalyst, a diluent, a surface treatment agent, and/or a curing agent, to form a mixture, and milling the mixture in a first immersion mill comprising milling media, to form a milled resin system. The milled resin system comprises nonspherical silica nanoparticles dispersed in a curable resin. The mixture comprises less than 2% by weight solvent.

Advantageously, methods according to the present application eliminate the need to employ a solvent, or a silica nanoparticle sol to effectively disperse the silica nanoparticles in a curable resin. The silica nanoparticles, moreover, need not be functionalized with a surface treatment agent prior to mixing with a curable resin. Hence, it is a benefit of embodiments of the method that high loadings (e.g., greater than 10 weight percent) of aggregated silica nanoparticles are dispersed in a curable resin while optionally including in the nanocomposite one or more of a dispersant, a catalyst, a diluent, a surface treatment agent, or a curing agent. Such optional components, however, are able to be mixed into the nanocomposite simultaneously with the aggregated silica nanoparticles and curable resin.

Methods of the present disclosure are typically performed using an immersion mill apparatus, which combines milling and mixing to disperse a solid component into a liquid component, particularly for high viscosity systems. One suitable immersion mill apparatus is described in U.S. Pat. No. 7,175,118 (Hockmeyer). Such immersion mill apparatuses typically include a mixing tank for holding the mixture to be milled, each of 1) a high shear impeller assembly, 2) a low shear mixer blade assembly, and 3) an immersion mill, for immersion in the mixing tank, and controllers for simultaneously operating the assemblies. In operation, the mixture is directed by the low shear mixer blade assembly to the high shear impeller assembly to initiate dispersion of the solid components into the liquid components, and then to the immersion mill for milling to decrease the aggregate sizes of any aggregated solid components (e.g., aggregated silica nanoparticles) and to further disperse the solid component in the liquid component. In certain embodiments, the milling media in the immersion mill comprises zirconia particles, preferably yttrium-stabilized zirconia beads.

The aggregated silica nanoparticles typically comprise a particle size of about 250 micrometers (μm), or between about 25 μm and about 300 μm, or between about 25 μm and about 100 μm, or between about 100 μm and about 300 μm, or between about 200 μm and about 300 μm.

In embodiments of the method, the milling of the aggregated silica nanoparticles and curable resin is performed until the aggregated silica nanoparticles are dispersed to form nonspherical silica nanoparticles comprising an average particle size (of the longest dimension) in the range from about 1 nanometer to about 1000 nanometers, or from about 1 nanometer to about 500 nanometers, or from about 1 nanometer to about 100 nanometers, or from about 1 nanometer to about 50 nanometers, or from about 100 nanometers to about 400 nanometers, or from about 500 nanometers to about 1000 nanometers. The nonspherical silica nanoparticles typically comprise a bimodal particle size distribution or a unimodal particle size distribution.

In certain embodiments of the method, the nanoparticle-containing curable resin system comprises from about 10 to about 30 weight percent, or from about 10 to about 50 weight percent, or from about 10 to about 70 weight percent, or from about 15 to about 50 weight percent, or from about 20 to about 50 weight percent, or from about 20 to about 35 weight percent, or from about 25 to about 50 weight percent, or from about 30 to about 50 weight percent, or from about 15 to about 70 weight percent, or from about 25 to about 70 weight percent, or from about 35 to about 70 weight percent, or from about 50 to about 70 weight percent of the nonspherical silica nanoparticles. In an embodiment, the milled resin system consists essentially of about 10 to about 70 weight percent of nonspherical silica nanoparticles dispersed in a curable resin.

In certain embodiments, the method comprises including at least one additional component (e.g., additive) with the aggregated silica nanoparticles and curable resin. Such components include for example and without limitation, dispersants, diluents, catalysts, surface treatment agents, curing agents, cure accelerators, defoamers, air release agents, crosslinking agents, dyes, flame retardants, pigments, impact modifiers, and flow control agents. In certain embodiments, the method further comprises including a dispersant with the aggregated silica nanoparticles and curable resin. In certain embodiments, the method further comprises including a catalyst with the aggregated silica nanoparticles and curable resin for reacting silanol groups on the surface of the silica nanoparticles with the curable resin system. In certain embodiments, the method further comprises including a diluent with the aggregated silica nanoparticles and curable resin. In certain embodiments, the method further comprises including a surface treatment agent with the aggregated silica nanoparticles and curable resin. It is an advantage of such embodiments that a dispersant, a catalyst, a diluent, and/or a surface treatment agent are included in a nanocomposite comprising a curable resin and aggregated silica nanoparticles, rather than requiring mixture or reaction with the aggregated silica nanoparticles prior to mixing with the curable resin. Suitable dispersant(s), catalyst(s), diluent(s) and surface treatment agent(s) are as described in detail above.

In some embodiments, the method further comprises including fillers (e.g., reinforcing fibers, hollow glass spheres, etc.) in the milled resin system. Fillers suitable for including in the milled resin system are as described in detail above.

Exemplary Embodiments

1. A nanocomposite including nonspherical silica nanoparticles dispersed in a curable resin, wherein the nanocomposite contains less than 2% by weight solvent.

2. The nanocomposite of embodiment 1 wherein the nonspherical silica nanoparticles include a population of clusters of primary spherical silica nanoparticles. The population of clusters includes a mean size in the range of from 40 to 900 nanometers, and the primary spherical silica nanoparticles have a diameter in the range of from 1 to 100 nanometers.

3. The nanocomposite of embodiment 1 or embodiment 2, further including a dispersant.

4. The nanocomposite of embodiment 3 wherein the dispersant includes a copolymer having acidic groups.

5. The nanocomposite of embodiment 3 or embodiment 4 wherein the dispersant includes a phosphoric acid polyester dispersant, a Jeffamine sulfonate, a hyperbranched high molecular weight polyester, or a combination thereof.

6. The nanocomposite of any one of embodiments 1 through 5 further including a catalyst for reacting silanol groups on the surface of the silica nanoparticles with the curable resin system.

7. The nanocomposite of embodiment 6 wherein the catalyst includes stannous chloride ($SnCl_2$) or methylethylketone peroxide.

8. The nanocomposite of any one of embodiments 1 through 7 further including a surface treatment agent including an organosilane, a monohydric alcohol, a polyol, or a combination thereof.

9. The nanocomposite of embodiment 8 wherein the surface treatment agent comprises phenyl trimethoxysilane, benzooxasilepin dimethyl ester, phenethyltrimethoxy silane, N-phenylaminopropyl trimethoxysilane, or a mixture thereof.

10. The nanocomposite of any one of embodiments 1 through 9 further including at least one diluent.

11. The nanocomposite of embodiment 10 wherein the at least one diluent includes a mono- or poly-functional glycidyl ether, styrene, or a combination thereof.

12. The nanocomposite of any one of embodiments 1 through 11 further including at least one additive selected from the group consisting of curing agents, cure accelerators, defoamers, air release agents, crosslinking agents, dyes, flame retardants, pigments, impact modifiers, and flow control agents.

13. The nanocomposite of any one of embodiments 1 through 12 wherein the nonspherical silica nanoparticles include a bimodal particle size distribution.

14. The nanocomposite of any one of embodiments 1 through 12 wherein the nonspherical silica nanoparticles include a unimodal particle size distribution.

15. The nanocomposite of any one of embodiments 1 through 14 wherein the curable resin includes an epoxy resin, a curable imide resin, a vinyl ester resin, an acrylic resin, a bisbenzocyclobutane resin, a polycyanate ester resin, or a mixture thereof.

16. The nanocomposite of any one of embodiments 1 through 15 wherein the curable resin includes an epoxy resin, a maleimide resin, a polycyanate ester resins, or a mixture thereof.

17. The nanocomposite of any one of embodiments 1 through 16 wherein the curable resin includes a digycidyl ether of bisphenol A, a diglycidyl ether of bisphenol F, ethylidene bis-4,1-phenylene dicyanate, N,N'-4,4'-diphenyl-methanebismaleimide, 4,4'-(1-methylethylidene)bis(2-(2-propenyl)phenol), or a mixture thereof.

18. The nanocomposite of any one of embodiments 1 through 17 wherein the curable resin includes an epoxy resin or a mixture of epoxy resins.

19. The nanocomposite of any one of embodiments 1 or 3 through 18 wherein the nonspherical silica nanoparticles include an average particle size in the range from about 1 nanometer to about 1000 nanometers.

20. The nanocomposite of any one of embodiments 1 or 3 through 19 wherein the nonspherical silica nanoparticles include an average particle size in the range from about 1 nanometer to about 500 nanometers.

21. The nanocomposite of any one of embodiments for 3 through 20 wherein the nonspherical silica nanoparticles include an average particle size in the range from about 1 nanometer to about 100 nanometers.

22. The nanocomposite of any one of embodiments 1 through 21 wherein the nanocomposite includes from about 10 to about 70 weight percent of the nonspherical silica nanoparticles.

23. The nanocomposite of any one of embodiments 1 through 22 wherein the nanocomposite includes from about 15 to about 30 weight percent of the nonspherical silica nanoparticles.

24. The nanocomposite of any one of embodiments 1 through 22 wherein the nanocomposite includes from about 20 to about 70 weight percent of the nonspherical silica nanoparticles.

25. The nanocomposite of any one of embodiments 1 through 24 further including a filler including at least one of reinforcing continuous fibers, reinforcing discontinuous fibers, and hollow glass bubbles.

26. The nanocomposite of embodiment 25 wherein the filler includes at least one of reinforcing continuous fibers and reinforcing discontinuous fibers.

27. The nanocomposite of embodiment 25 or embodiment 26 wherein the filler includes carbon, glass, ceramic, boron, silicon carbide, basalt, ceramic, polyimide, polyamide, polyethylene, or a combination thereof.

28. The nanocomposite of any one of embodiments 25 through 27 wherein said reinforcing fibers include a unidirectional array of individual continuous fibers, woven fabric, knitted fabric, yarn, roving, braided constructions, or nonwoven mat.

29. The nanocomposite of any one of embodiments 1 through 28 wherein the nanocomposite includes less than 0.5% by weight solvent.

30. The nanocomposite of any one of embodiments 1 through 29 further including a curing agent including an amine curing agent, an anhydride curing agent, a dicyandiamide curing agent, a diaminodiphenyl sulfone curing agent, or a combination thereof.

31. The nanocomposite of embodiment 30 wherein the curing agent includes an amine curing agent.

32. The nanocomposite of embodiment 30 wherein the curing agent includes an anhydride curing agent.

33. The nanocomposite of embodiment 30 wherein the curing agent includes a dicyandiamide curing agent.

34. The nanocomposite of embodiment 1 wherein the nanocomposite consists essentially of the nonspherical silica nanoparticles dispersed in the curable resin.

35. A prepreg including the nanocomposite of any one of embodiments 1 through 34.

36. A composite including the cured nanocomposite of any one of embodiments 1 through 24 or 29 through 35 as a matrix resin and at least one filler embedded in the matrix resin.

37. An article including the composite of embodiment 36.

38. A composite including from about 4 to 70 weight percent of nonspherical silica nanoparticles dispersed in a cured resin, and a filler embedded in the cured resin. The filler includes at least one of a reinforcing continuous fiber, reinforcing discontinuous fibers, and hollow glass bubbles.

39. The composite of embodiment 38, wherein the nonspherical silica nanoparticles include a population of clusters of primary spherical silica nanoparticles. The population of clusters includes a mean size in the range of from 40 to 900 nanometers, and the primary spherical silica nanoparticles have a diameter in the range of from 1 to 100 nanometers.

40. The composite of embodiment 38 or embodiment 39, further including a dispersant.

41. The composite of embodiment 40 wherein the dispersant includes a copolymer having acidic groups.

42. The composite of embodiment 40 or embodiment 41 wherein the dispersant includes a phosphoric acid polyester dispersant, a Jeffamine sulfonate, a hyperbranched high molecular weight polyester, or a combination thereof.

43. The composite of any one of embodiments 38 through 42 further including a catalyst.

44. The composite of embodiment 43 wherein the catalyst includes stannous chloride ($SnCl_2$) or methylethylketone peroxide.

45. The composite of any one of embodiments 38 through 44 further including a surface treatment agent including an organosilane, a monohydric alcohol, a polyol, or a combination thereof.

46. The composite of embodiment 45 wherein the surface treatment agent comprises phenyl trimethoxysilane, benzooxasilepin dimethyl ester, phenethyltrimethoxy silane, N-phenylaminopropyl trimethoxysilane, or a mixture thereof.

47. The composite of any one of embodiments 38 through 46 further including at least one diluent.

48. The composite of embodiment 47 wherein the at least one diluent includes a mono- or poly-functional glycidyl ether, styrene, or a combination thereof.

49. The composite of any one of embodiments 38 through 48 further including at least one additive selected from the group consisting of curing agents, cure accelerators, defoamers, air release agents, crosslinking agents, dyes, flame retardants, pigments, impact modifiers, and flow control agents.

50. The composite of any one of embodiments 38 through 49 wherein the nonspherical silica nanoparticles include a bimodal particle size distribution.

51. The composite of any one of embodiments 38 through 49 wherein the nonspherical silica nanoparticles include a unimodal particle size distribution.

52. The composite of any one of embodiments 38 through 51 wherein the cured resin includes an epoxy resin, a cured imide resin, a vinyl ester resin, an acrylic resin, a bisbenzocyclobutane resin, a polycyanate ester resin, or a mixture thereof.

53. The composite of any one of embodiments 38 through 52 wherein the cured resin includes an epoxy resin, a maleimide resin, a polycyanate ester resins, or a mixture thereof.

54. The composite of any one of embodiments 38 through 53 wherein the cured resin includes a digicydyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

55. The composite of any one of embodiments 38 through 54 wherein the curable resin includes an epoxy resin or a mixture of epoxy resins.

56. The composite of any one of embodiments 38 or 40 through 55 wherein the nonspherical silica nanoparticles include an average particle size in the range from about 1 nanometer to about 1000 nanometers.

57. The composite of any one of embodiments 38 or 40 through 56 wherein the nonspherical silica nanoparticles include an average particle size in the range from about 1 nanometer to about 500 nanometers.

58. The composite of any one of embodiments 38 or 40 through 57 wherein the nonspherical silica nanoparticles include an average particle size in the range from about 1 nanometer to about 100 nanometers.

59. The composite of any one of embodiments 38 through 58 wherein the composite includes from about 10 to about 50 weight percent of the nonspherical silica nanoparticles.

60. The composite of any one of embodiments 38 through 59 wherein the composite includes from about 15 to about 30 weight percent of the nonspherical silica nanoparticles.

61. The composite of any one of embodiments 38 through 60 wherein the composite includes from about 20 to about 70 weight percent of the nonspherical silica nanoparticles.

62. The composite of any one of embodiments 38 through 61 wherein the filler includes at least one of reinforcing continuous fibers and reinforcing discontinuous fibers.

63. The composite of embodiment 62 wherein the filler includes carbon, glass, ceramic, boron, silicon carbide, basalt, ceramic, polyimide, polyamide, polyethylene, polypropylene, polyacrylnitrile, or a combination thereof.

64. The composite of embodiment 62 or embodiment 63 wherein the reinforcing continuous fibers include a unidirectional array of individual continuous fibers, woven fabric, knitted fabric, yarn, roving, braided constructions, or nonwoven mat.

65. The composite of any one of embodiments 38 through 64 further including a curing agent including an amine curing agent, an anhydride curing agent, a dicyandiamide curing agent, a diaminodiphenyl sulfone curing agent, or a combination thereof.

66. The composite of embodiment 65 wherein the curing agent includes an amine curing agent.

67. The composite of embodiment 65 wherein the curing agent includes an anhydride curing agent.

68. The composite of embodiment 65 wherein the curing agent includes a dicyandiamide curing agent.

69. The composite of embodiment 65 wherein the curing agent includes a diaminodiphenyl sulfone curing agent.

70. The composite of embodiment 38 wherein the composite consists essentially of the nonspherical silica nanoparticles dispersed in the curable resin and the filler embedded in the cured resin.

71. An article including from about 10 to about 50 weight percent of nonspherical silica nanoparticles dispersed in a cured resin, wherein the nonspherical silica nanoparticles comprise one or more irregular shapes.

72. The article of embodiment 71, wherein the nonspherical silica nanoparticles include a population of clusters of primary spherical silica nanoparticles. The population of clusters includes a mean size in the range of from 40 to 900 nanometers, and the primary spherical silica nanoparticles have a diameter in the range of from 1 to 100 nanometers.

73. The article of embodiment 71 further including a dispersant.

74. The article of embodiment 73 wherein the dispersant includes a copolymer having acidic groups.

75. The article of embodiment 73 or embodiment 74 wherein the dispersant includes a phosphoric acid polyester dispersant, a Jeffamine sulfonate, a hyperbranched high molecular weight polyester, or a combination thereof.

76. The article of any one of embodiments 71 through 75 further including a catalyst.

77. The article of embodiment 76 wherein the catalyst includes stannous chloride ($SnCl_2$) or methylethylketone peroxide.

78. The article of any one of embodiments 71 through 77 further including a surface treatment agent including an organosilane, a monohydric alcohol, a polyol, or a combination thereof.

79. The article of embodiment 78 wherein the surface treatment agent comprises phenyl trimethoxysilane, benzooxasilepin dimethyl ester, phenethyltrimethoxy silane, N-phenylaminopropyl trimethoxysilane, or a mixture thereof.

80. The article of any one of embodiments 71 through 79 further including at least one diluent.

81. The article of embodiment 80 wherein the at least one diluent includes a mono- or poly-functional glycidyl ether, styrene, or a combination thereof.

82. The article of any one of embodiments 71 through 81 further including at least one additive selected from the group consisting of curing agents, cure accelerators, defoamers, air release agents, crosslinking agents, dyes, flame retardants, pigments, impact modifiers, and flow control agents.

83. The article of any one of embodiments 71 through 82 wherein the nonspherical silica nanoparticles include a bimodal particle size distribution.

84. The article of any one of embodiments 71 through 82 wherein the nonspherical silica nanoparticles include a unimodal particle size distribution.

85. The article of any one of embodiments 71 through 84 wherein the cured resin includes an epoxy resin, a cured imide resin, a vinyl ester resin, an acrylic resin, a bisbenzocyclobutane resin, a polycyanate ester resin, or a mixture thereof.

86. The article of any one of embodiments 71 through 85 wherein the cured resin includes an epoxy resin, a maleimide resin, a polycyanate ester resins, or a mixture thereof.

87. The article of any one of embodiments 71 through 86 wherein the cured resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

88. The article of any one of embodiments 71 through 87 wherein the cured resin includes an epoxy resin or a mixture of epoxy resins.

89. The article of any one of embodiments 71 or 73 through 88 wherein the nonspherical silica nanoparticles include an average particle size in the range from about 1 nanometer to about 1000 nanometers.

90. The article of any one of embodiments 71 or 73 through 89 wherein the nonspherical silica nanoparticles include an average particle size in the range from about 1 nanometer to about 500 nanometers.

91. The article of any one of embodiments 71 or 73 through 90 wherein the nonspherical silica nanoparticles include an average particle size in the range from about 1 nanometer to about 100 nanometers.

92. The article of any one of embodiments 71 through 91 wherein the article includes from about 10 to about 30 weight percent of the nonspherical silica nanoparticles.

93. The article of any one of embodiments 71 through 92 wherein the article includes from about 15 to about 30 weight percent of the nonspherical silica nanoparticles.

94. The article of any one of embodiments 71 through 92 wherein the article includes from about 20 to about 70 weight percent of the nonspherical silica nanoparticles.

95. The article of any one of embodiments 71 through 94 further including a filler embedded in the cured resin, wherein the filler includes at least one of reinforcing continuous fibers, reinforcing discontinuous fibers, and hollow glass bubbles.

96. The article of embodiment 95 wherein the filler includes at least one of reinforcing continuous fibers and reinforcing discontinuous fibers.

97. The article of embodiment 95 or embodiment 96 wherein the filler includes carbon, glass, ceramic, boron, silicon carbide, basalt, ceramic polyimide, polyamide, polyethylene, polypropylene, polyacrylnitrile, or a combination thereof.

98. The article of embodiment 95 through 97 wherein the reinforcing continuous fibers include a unidirectional array of individual continuous fibers, woven fabric, knitted fabric, yarn, roving, braided constructions, or non-woven mat.

99. The article of any one of embodiments 71 through 98 further including a curing agent including an amine curing agent, an anhydride curing agent, a dicyandiamide curing agent, a diaminodiphenyl sulfone, or a combination thereof.

100. The article of embodiment 99 wherein the curing agent includes an amine curing agent.

101. The article of embodiment 99 wherein the curing agent includes an anhydride curing agent.

102. The article of embodiment 99 wherein the curing agent includes a dicyandiamide curing agent.

103. The article of embodiment 99 wherein the curing agent includes a diaminodiphenyl sulfone curing agent.

104. The article of any one of embodiments 71 through 103 wherein the article includes a turbine blade, a pressure vessel, an aerospace part, a cable, or sporting goods equipment.

105. The article of embodiment 104 wherein the article includes a golf club, a baseball bat, a fishing rod, a racquet, or a bicycle frame.

106. The article of embodiment 104 wherein the article includes a pressure vessel.

107. The article of embodiment 71 wherein the nanocomposite consists essentially of about 4 to about 50 weight percent of nonspherical silica nanoparticles dispersed in a cured resin.

108. A method of preparing a nanoparticle-containing curable resin system including mixing from 10 to 70 weight percent of aggregated silica nanoparticles with a curable resin, and optionally a dispersant, a catalyst, a surface treatment agent, and/or a diluent, to form a mixture, wherein the mixture includes less than 2% by weight solvent; and milling the mixture in a first immersion mill including milling media to form a milled resin system comprising nonspherical silica nanoparticles dispersed in the curable resin.

109. The method of embodiment 108 wherein the aggregated silica nanoparticles include an average size in the range from about 25 micrometers (μm) to about 300 μm.

110. The method of embodiment 108 or embodiment 109, wherein the nonspherical silica nanoparticles include a population of clusters of primary spherical silica nanoparticles. The population of clusters includes a mean size in the range of from 40 to 900 nanometers, and the primary spherical silica nanoparticles have a diameter in the range of from 1 to 100 nanometers.

111. The method of any one of embodiments 108 through 110 wherein the milling media includes zirconia particles.

112. The method of any one of embodiments 108 through 111 wherein the milling media includes yttrium-stabilized zirconia beads.

113. The method of any one of embodiments 108 through 109 or 111 through 112 wherein the milling is performed until the aggregated silica nanoparticles are dispersed to form nonspherical silica nanoparticles including an average particle size in the range from about 1 nanometer to about 1000 nanometers.

114. The method of any one of embodiments 108 through 109 or 111 through 113 wherein the nonspherical silica nanoparticles include an average particle size in the range from about 1 nanometer to about 500 nanometers.

115. The method of embodiment 108 through 109 or 111 through 114 wherein the nonspherical silica nanoparticles include an average particle size in the range from about 1 nanometer to about 100 nanometers.

116. The method of any one of embodiments 108 through 115 further comprising including a dispersant in the mixture.

117. The method of embodiment 116 wherein the dispersant includes a copolymer having acidic groups.

118. The method of embodiment 116 or embodiment 117 wherein the dispersant includes a phosphoric acid polyester dispersant, a Jeffamine sulfonate, a hyperbranched high molecular weight polyester, or a combination thereof.

119. The method of any one of embodiments 108 through 118 further comprising including a catalyst in the mixture for reacting silanol groups on the surface of the silica nanoparticles with the curable resin system.

120. The method of embodiment 119 wherein the catalyst includes stannous chloride ($SnCl_2$) or methylethylketone peroxide.

121. The method of any one of embodiments 108 through 120 further including a surface treatment agent including an organosilane, a monohydric alcohol, a polyol, or a combination thereof.

122. The method of embodiment 121 wherein the surface treatment agent includes surfaces treated with phenyl trimethoxysilane, benzooxasilepin dimethyl ester, phenethyltrimethoxy silane, N-phenylaminopropyl trimethoxysilane, or a mixture thereof.

123. The method of any one of embodiments 108 through 122 further comprising including at least one diluent in the mixture.

124. The method of embodiment 123 wherein the at least one diluent includes a mono- or poly-functional glycidyl ether, styrene, or a combination thereof.

125. The method of any one of embodiments 108 through 124 further including at least one additive selected from the group consisting of curing agents, cure accelerators, catalysts, defoamers, air release agents, crosslinking agents, dyes, flame retardants, pigments, impact modifiers, and flow control agents.

126. The method of any one of embodiments 108 through 125 wherein the nonspherical silica nanoparticles include a bimodal particle size distribution.

127. The method of any one of embodiments 108 through 125 wherein the nonspherical silica nanoparticles include a unimodal particle size distribution.

128. The method of any one of embodiments 108 through 127 wherein the curable resin includes an epoxy resin, a curable imide resin, a vinyl ester resin, an acrylic resin, a bisbenzocyclobutane resin, a polycyanate ester resin, or a mixture thereof.

129. The method of any one of embodiments 108 through 128 wherein the curable resin includes an epoxy resin, a maleimide resin, a polycyanate ester resins, or a mixture thereof.

130. The method of any one of embodiments 108 through 129 wherein the curable resin includes a digycidyl ether of bisphenol A, a diglycidyl ether of bisphenol F, ethylidene bis-4,1-phenylene dicyanate, N,N'-4,4'-diphenylmethanebismaleimide, 4,4'-(1-methylethylidene)bis(2-(2-propenyl)phenol), or a mixture thereof.

131. The method of any one of embodiments 108 through 130 wherein the curable resin includes an epoxy resin or a mixture of epoxy resins.

132. The method of any one of embodiments 108 through 131 wherein the milled resin system includes from about 15 to about 30 weight percent of the nonspherical silica nanoparticles.

133. The method of any one of embodiments 108 through 132 wherein the milled resin system includes from about 20 to about 30 weight percent of the nonspherical silica nanoparticles.

134. The method of any one of embodiments 108 through 131 wherein the milled resin system includes from about 20 to about 70 weight percent of the nonspherical silica nanoparticles.

135. The method of any one of embodiments 108 through 134 further comprising including a filler in the milled resin system including at least one of reinforcing continuous fibers, reinforcing discontinuous fibers, and hollow glass bubbles.

136. The method of embodiment 135 wherein the filler includes at least one of reinforcing continuous fibers and reinforcing discontinuous fibers.

137. The method of embodiment 135 or embodiment 136 wherein the filler includes carbon, glass, ceramic, boron, silicon carbide, basalt, ceramic, polyimide, polyamide, polyethylene, polypropylene, polyacrylnitrile, or a combination thereof.

138. The method of embodiment 135 or embodiment 136 wherein the reinforcing continuous fibers include a unidirectional array of individual continuous fibers, woven fabric, knitted fabric, yarn, roving, braided constructions, or nonwoven mat.

139. The method of any one of embodiments 108 through 138 further comprising including a curing agent in the mixture, the curing agent including an amine curing agent, an anhydride curing agent, a dicyandiamide curing agent, a diaminodiphenyl sulfone curing agent, or a combination thereof.

140. The method of embodiment 139 wherein the curing agent includes an amine curing agent.

141. The method of embodiment 139 wherein the curing agent includes an anhydride curing agent.

142. The method of embodiment 139 wherein the curing agent includes a dicyandiamide curing agent.

143. The method of embodiment 139 wherein the curing agent includes a diaminodiphenyl sulfone curing agent.

144. The method of embodiment 108 wherein the milled resin system consists essentially of about 10 to about 70 weight percent of nonspherical silica nanoparticles dispersed in a curable resin.

145. A nanocomposite including nonspherical silica nanoparticles dispersed in a curing agent, wherein the nanocomposite contains less than 2% by weight solvent.

146. The nanocomposite of embodiment 145 wherein the nonspherical silica nanoparticles include a population of clusters of primary spherical silica nanoparticles. The population of clusters includes a mean size in the range of from 40 to 900 nanometers, and the primary spherical silica nanoparticles have a diameter in the range of from 1 to 100 nanometers.

147. The nanocomposite of embodiment 145 or embodiment 146 wherein the curing agent includes an amine curing agent, an anhydride curing agent, a dicyandiamide curing agent, a diaminodiphenyl sulfone curing agent, or a combination thereof.

148. The nanocomposite of any one of embodiments 145 through 147 wherein the curing agent includes an amine curing agent.

149. The nanocomposite of any one of embodiments 145 through 147 wherein the curing agent includes an anhydride curing agent.

150. The nanocomposite of any one of embodiments 145 through 147 wherein the curing agent includes a dicyandiamide curing agent.

151. The nanocomposite of any one of embodiments 145 through 150, further including a dispersant.

152. The nanocomposite of embodiment 151 wherein the dispersant includes a copolymer having acidic groups.

153. The nanocomposite of embodiment 151 or embodiment 152 wherein the dispersant includes a phosphoric acid polyester dispersant, a Jeffamine sulfonate, a hyperbranched high molecular weight polyester, or a combination thereof.

154. The nanocomposite of any one of embodiments 145 through 153 further including a surface treatment agent including an organosilane, a monohydric alcohol, a polyol, or a combination thereof.

155. The nanocomposite of embodiment 154 wherein the surface treatment agent comprises phenyl trimethoxysilane, benzooxasilepin dimethyl ester, phenethyltrimethoxy silane, N-phenylaminopropyl trimethoxysilane, or a mixture thereof.

156. The nanocomposite of any one of embodiments 145 through 155 further including at least one diluent.

157. The nanocomposite of embodiment 156 wherein the at least one diluent includes a mono- or poly-functional glycidyl ether, styrene, or a combination thereof.

158. The nanocomposite of any one of embodiments 145 through 157 further including at least one additive selected from the group consisting of cure accelerators, defoamers, air release agents, crosslinking agents, dyes, flame retardants, pigments, impact modifiers, and flow control agents.

159. The nanocomposite of any one of embodiments 145 through 158 wherein the nonspherical silica nanoparticles include a bimodal particle size distribution.

160. The nanocomposite of any one of embodiments 145 through 158 wherein the nonspherical silica nanoparticles include a unimodal particle size distribution.

161. The nanocomposite of any one of embodiments 145 or 147 through 160 wherein the nonspherical silica nanoparticles include an average particle size in the range from about 1 nanometer to about 1000 nanometers.

162. The nanocomposite of any one of embodiments 145 or 147 through 161 wherein the nonspherical silica nanoparticles include an average particle size in the range from about 1 nanometer to about 500 nanometers.

163. The nanocomposite of any one of embodiments 145 or 147 through 162 wherein the nonspherical silica nanoparticles include an average particle size in the range from about 1 nanometer to about 100 nanometers.

164. The nanocomposite of any one of embodiments 145 through 163 wherein the nanocomposite includes from about 10 to about 70 weight percent of the nonspherical silica nanoparticles.

165. The nanocomposite of any one of embodiments 145 through 164 wherein the nanocomposite includes from about 15 to about 30 weight percent of the nonspherical silica nanoparticles.

166. The nanocomposite of any one of embodiments 145 through 164 wherein the nanocomposite includes from about 20 to about 70 weight percent of the nonspherical silica nanoparticles.

167. The nanocomposite of any one of embodiments 145 through 166 further including a filler including at least one of reinforcing continuous fibers, reinforcing discontinuous fibers, and hollow glass bubbles.

168. The nanocomposite of embodiment 167 wherein the filler includes at least one of reinforcing continuous fibers and reinforcing discontinuous fibers.

169. The nanocomposite of embodiment 167 or embodiment 168 wherein the filler includes carbon, glass, ceramic, boron, silicon carbide, basalt, ceramic, polyimide, polyamide, polyethylene, or a combination thereof.

170. The nanocomposite of any one of embodiments 167 through 169 wherein said reinforcing fibers include a unidirectional array of individual continuous fibers, woven fabric, knitted fabric, yarn, roving, braided constructions, or non-woven mat.

171. The nanocomposite of any one of embodiments 145 through 170 wherein the nanocomposite includes less than 0.5% by weight solvent.

172. The nanocomposite of embodiment 145 wherein the nanocomposite consists essentially of the nonspherical silica nanoparticles dispersed in the curing agent.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Table 1 provides a description or role, and a source, for materials used in the Examples below:

TABLE 1

| Material | Description or Role | Source |
| --- | --- | --- |
| TIXOSIL 68 | Silica nanoparticles | Rhodia, Bristol, PA |
| ORISIL 200 | Silica nanoparticles | Orisil, Lviv, Ukraine |
| NALCO 2329 | Silica nanoparticles | Nalco Chemical Company, Oak Brook, IL |
| NALCO 2327 | Silica nanoparticles | Nalco Chemical Company |
| EPON 826 | Liquid epoxy resin | Momentive Performance Materials Inc., Albany, NY |
| EPON 1001F | Solid epoxy resin | Momentive Performance Materials Inc. |
| HELOXY 68 | Neopentyl glycol diglycidyl ether | Momentive Performance Materials Inc. |
| Phenyl trimethoxysilane | Silica surface treatment | Gelest, Inc,, Morrisville, PA |
| BYK W9010 | Dispersant copolymer with acidic groups | BYK USA, Inc., Wallingford, CT |
| Tin(II) chloride | Catalyst | Alfa Aesar, Ward Hill, MA |
| ETHACURE 100 | Amine curative | Albemarle Corporation, Baton Rouge, LA |
| EPIKURE 3230 | Amine curative | Momentive Performance Materials Inc. |
| EPIKURE 3300 | Amine curative | Momentive Performance Materials Inc. |
| Polyamidoamine Polymer | Amine curative | 3M Corporation, St. Paul, MN |
| 4,4' diaminodiphenyl sulfone | Amine curative | Alfa Aesar, Ward Hill, MA |
| LINDRIDE 36Y | Anhydride curative | Lindau Chemicals Inc., Columbia, SC |
| AMICURE CG-1200 | Dicyandiamide ("dicy") curative | Air Products and Chemicals, Inc., Allentown, PA |
| SAERTEX 955 | Continuous, unidirectional fiberglass mat, 955 grams per square meter | Fibre Glast Developments Corp., Brookville, OH |
| 251 Continuous Strand Mat | Chopped, omnidirectional fiberglass mat, 458 grams per square meter | Fibre Glast Developments Corp. |
| Tenax-A HT C438 | Chopped carbon fiber | Toho Tenax Americas, Inc., Rockwood, TN |

TABLE 1-continued

| Material | Description or Role | Source |
|---|---|---|
| iM30K | Hollow glass bubbles | 3M Company, |
| 1-methoxy-2-propanol | Solvent | Univar USA Inc., Kirkland, WA |
| Acetic acid | Catalyst | EMD Millipore, Darmstadt, Germany |
| Water | Deionized water | — |

Particle Size Test Method

Particle size of the silica particles was measured by laser diffraction using a Horiba LA-950 (Horiba, Kyoto, Japan). The optical model used a refractive index of 1.46 for silica and 1.38 for methylethylketone (MEK). The second differential method was used for smoothing based on 150 iterations. The dispersion was diluted to approximately 1 weight percent solids with MEK. The diluted sample was then added to the measurement cell which was filled with MEK until the transmittance was between the recommended levels of 85-95%. The particle size was reported as a mean (i.e., average diameter) and as a D90. D90 is defined as the diameter at which 90% of the particles have a diameter below the value.

Viscosity Test Method

Viscosity was measured according to ASTM D 2196. Measurements at constant temperature (see Table 9) were performed using a Brookfield CAP 2000+ viscometer (Brookfield Engineering, Middleboro, Mass.). Measurements as a function of temperature (see FIG. 1) were performed using an AR2000 viscometer (TA Instruments, New Castle, Del.).

Density Test Method

Density was measured according to ASTM 4052, using a Mettler Toledo XS 105 Balance with Density Kit (Mettler-Toledo, Columbus, Ohio).

Glass Transition Temperature Test Method

Glass transition temperature was measured according to ASTM D 7426, using a Q2000 differential scanning calorimeter (DSC) (TA Instruments, New Castle, Del.), or according to ASTM D 7028, using a Q800 dynamic mechanical analyzer (DMA) (TA Instruments, New Castle, Del.).

Nanocomposite Tensile Properties Test Method

Storage modulus was measured according to ASTM D 638, using a Q800 dynamic mechanical analyzer (DMA) (TA Instruments, New Castle, Del.).

Composite Tensile Properties Test Method

Tensile properties were measured according to ASTM D 3039, using a MTS Insight 30 kN test frame (MTS Systems Corp., Eden Prairie, Minn.).

Composite Compressive Properties Test Method

Compressive properties were measured according to ASTM D 695, using an Instron 5581 50 kN test frame (Instron, Norwood, Mass.).

Immersion Mill Method

Example silica nanocomposites were prepared using the following solvent-free milling process. A premix was prepared with the components of the silica nanocomposite. Epoxy resin (EPON 826) was preheated to 90° C. in an 11.5 liter stainless steel vessel to decrease its viscosity for ease of handling. The preheated epoxy resin was transferred to a 7.6 liter stainless steel jacketed kettle equipped with a helical scraper in contact with both the wall and floor of the kettle (Hockmeyer Equipment Corporation, Elizabeth City, N.C.). A 1:3 ethylene glycol:water mixture was circulated through the jacket of the kettle to control composition temperature during preparation of the premix as well as during milling. The temperature of the glycol:water mixture, and in turn, the composition was regulated by a circulator (PHOENIX II, Thermo Fisher Scientific, Newington, N.H.). The kettle containing epoxy was secured to the frame of a disperser equipped with a 90 millimeter f-blade (DISPERMAT, CN-10, BYK-Gardner, Columbia, Md.). After activation of the scraper and f-blade, a catalyst, dispersant, pre-hydrolyzed aqueous silane solution, or reactive diluent might be added to the kettle containing the epoxy as described in the Examples. To complete the premix, a dry precipitated silica powder (TIXOSIL 68) was gradually added to the kettle. TIXOSIL 68 is a spherical silica microparticle with a nominal diameter and a surface area of 250 µm and 160 $m^2/g$, respectively.

Milling was performed using a HCPS-1/4 immersion mill (Hockmeyer Equipment Corporation, Elizabeth City, N.C.). The immersion mill was operated with either a 0.1 millimeter wire wedge (WW) or a 0.1 millimeter electron beam drilled (EBD) screen filled with approximately 500 grams of 0.5 mm yttrium-stabilized zirconia milling media. Enclosed in the media field were 24 pegs to agitate the media. A clipped marine prop at the bottom exterior of the screen provided the driving force for material to circulate through the media field. In some Examples, the immersion mill was operated with an auger with a 1.9 centimeter pitch. In some Examples, the mill hardware (screen, milling media, pegs, prop, and auger) was wetted and heated with epoxy resin (EPON 826) prior to milling. To accomplish this, the mill hardware was immersed in a stainless steel vessel containing epoxy resin (EPON 826) and the mill activated. The process of milling the pure epoxy resin both wetted and heated the mill hardware that would be in contact with the composition. After wetting and heating, the hardware was raised from the pure epoxy resin and the mill jogged to remove excess pure epoxy resin from the hardware. The kettle containing the premix was then transferred from the disperser station to the milling station and milling initiated. The mill was operated at 60 Hertz.

To regulate composition temperature, a glycol:water mixture was circulated through the kettle jacket as described above and laboratory water was flowed through the rack dome of the mill. For Examples containing a pre-hydrolyzed aqueous silane solution, the water of the solution would be vaporized during the milling operation rendering the resulting nanocomposite solvent-free. The silane was pre-hydrolyzed to eliminate the need for solvent for the water immiscible silane used. While initially immiscible with water, the silane was fully miscible once hydrolyzed. The pre-hydrolysis would also be expected to decrease the surface treatment reaction time with the silica particles. Aside from the silane containing Examples, none of the other milling Examples used either water or solvent.

Milling resulted in size reduction of the silica particles from tens to hundreds of micrometers to about a hundred nanometers, as well as simultaneous surface modification of the silica, and compounding of the silica nanoparticles into the epoxy resin. Milling was continued until no further significant reduction in silica particle size was measured.

COMPARATIVE EXAMPLE 1

Solvent-based Silica Nanocomposite with Silane

The silica nanocomposite of Comparative Example 1 was prepared using a mixture of surface treated colloidal silicas (NALCO 2329 and NALCO 2327). The surface treatment process of Comparative Example 2 was similar to the methods described in Examples 1 and 9-13 of International Patent Application Publication No. WO 2009/120846 (Tiefenbruck et al.). Phenyl trimethoxysilane (TMPS) was used as the surface treatment agent. Upon completion of the surface treatment process, epoxy (EPON 826) was compounded into the dispersion. The dispersion was then fed through a wiped film evaporator to remove the water and solvent from the dispersion, according to methods described in International Patent Application Publication No. WO 2011/159521 (Thunhorst et al.). The completion of the stripping process yielded a nanocomposite of silane covalently bonded to the silica in epoxy. The silica nanocomposite was diluted with epoxy (EPON 826) using a speed-mixer (Model ARV-3 Vacuum Mixer, Thinky USA, Inc., Laguna Hills, Calif.) to achieve the final composition of Table 2.

EXAMPLE 1

Solvent-free Silica Nanocomposite with Catalyst

The silica nanocomposite of Example 1 was prepared according to the composition of Table 2 using the solvent-free Immersion Mill Method described above. A catalyst was used in an effort to react the silanol groups of the silica particles with the epoxy thus serving to both stabilize the milled particles and improve compatibility between the silica particles and epoxy resin. The mill hardware was not wetted and heated prior to milling. The composition was milled using a 0.1 millimeter WW screen for 4 hours and 30 minutes at a nominal temperature of 99° C. The mean and D90 particle size of the silica nanoparticles in the resulting nanocomposite were 197 and 262 nanometers, respectively.

TABLE 2

| | Solvent-based | Solvent-free Surface Treatment: | | | | |
|---|---|---|---|---|---|---|
| | Silane | Catalyst | None | Dispersant | Silane | Dispersant |
| | | | Example: | | | |
| Formulation (wt %): | CE 1 | EX 1 | EX 2 | EX 3 | EX 4 | EX 5a |
| Silica Nanoparticle | 19.9 | 20.0 | 20.0 | 19.5 | 19.9 | 20.0 |
| Epoxy (EPON 826) | 79.4 | 79.9 | 80.0 | 78.1 | 79.7 | 58.3 |
| Diluent (HELOXY 68) | — | — | — | — | — | 19.4 |
| Catalyst (SnCl$_2$) | — | 0.1 | — | — | — | — |
| Dispersant (BYK W 9010) | — | — | — | 2.4 | — | 2.2 |
| Silane (TMPS) | 0.7 | — | — | — | 0.4 | — |
| Mill Time (hr:min) | — | 4:30 | 3:30 | 6:30 | 6:00 | 5:30 |
| Mill Temperature (° C.) | — | 99 | 135 | 116 | 120 | 98 |
| Viscosity (Pa-s) @ 30° C. | 9.03 | 91.68 | 47.25 | 43.49 | 42.32 | 4.71 |
| Mean Particle Size (nm) | N.M.[1] | 197 | 128 | 127 | 90 | 101 |
| D90 Particle Size (nm) | N.M.[1] | 262 | 175 | 121 | 143 | 130 |
| Particle Shape | Spherical | Non-spherical | Non-spherical | Non-spherical | Non-spherical | Non-spherical |

[1]N.M. means "not measured"

EXAMPLE 2

Solvent-free Silica Nanocomposite with No Surface Treatment

The silica nanocomposite of Example 2 was prepared according to the composition of Table 2 using the solvent-free milling process of Example 1. No additives were used to treat the surface of the silica. Typical nanocomposite processing includes a surface treatment process to render the silica nanoparticle compatible with the matrix resin. No such process was used in this Example. The composition of this Example was milled for 3 hours and 30 minutes at a nominal temperature of 135° C. The mean and D90 particle size of the silica nanoparticles in the resulting nanocomposite were 128 and 175 nanometers, respectively.

EXAMPLE 3

Solvent-free Silica Nanocomposite with Dispersant

The silica nanocomposite of Example 3 was prepared according to the composition of Table 2 using the solvent-free milling process of Example 1. A dispersant (BYK W9010) was used to treat the silica particle surface. The dispersant was chosen to serve two purposes: 1) to reduce the tendency for the particle to reaggregate once milled to smaller sizes; and 2) to chemically modify the particle surface to make it more compatible with the epoxy resin. The mill hardware was wetted and heated as described in the Immersion Mill Method. The composition of this example was milled for 6 hours and 30 minutes at a nominal temperature of 116° C. The mean and D90 particle size of the silica nanoparticles in the resulting nanocomposite were 127 and 121 nanometers, respectively.

EXAMPLE 4

Solvent-free Silica Nanocomposite with Silane

The silica nanocomposite of Example 4 was prepared according to the composition of Table 2 using the milling process of Example 1 except that a 0.1 millimeter EBD screen was used in the immersion mill. A silane, phenyl trimethoxysilane (TMPS), was used to treat the silica surface. The silane was pre-hydrolyzed in a 1:1 silane:deionized water mixture with 0.1 weight percent acetic acid used as catalyst for the hydrolysis. The silane was chosen to stabilize the milled silica particles and improve compatibility between the particles and epoxy resin. This example also enables comparison between the solvent-based and solvent-free processes where the same surface treatment is used. The composition of this example was milled for 6 hours at a nominal temperature of 120° C. The mean and D90 particle size of the silica nanoparticles in the resulting solvent-free silica nanocomposite were 90 and 143 nanometers, respectively.

EXAMPLE 5

Solvent-free Silica Nanocomposite with Reactive Diluent

The silica nanocomposite of Example 5 was prepared according to the composition of Table 2 using the solvent-free milling process of Example 1. A dispersant (BYK W9010) and reactive diluent (HELOXY 68) were used. The dispersant was used for reasons described in Example 3. The reactive diluent was used to decrease the viscosity of the nanocomposite. A higher silica (TIXOSIL 68) concentration (24.3 weight percent) was milled in this example compared with previous examples. The composition of this example was milled for 5 hours and 30 minutes at a nominal temperature of 98° C. The mean and D90 particle size of the nanoparticles in the resulting solvent-free silica nanocomposite were 101 and 130 nanometers, respectively.

EXAMPLE 5a

Solvent-free Silica Nanocomposite with Reactive Diluent

The silica nanocomposite of Example 5a was prepared by dilution of the milled composition of Example 5 with epoxy resin (EPON 826) and reactive diluent (HELOXY 68) to yield 20 weight percent of silica in the final solvent-free nanocomposite. The dilution was performed with a speedmixer (Model ARV-3 Vacuum Mixer, Thinky USA, Inc., Laguna Hills, Calif.). The final composition and viscosity are shown in Table 2.

FIG. 1 is a graph presenting the measured viscosity as a function of temperature for the silica nanocomposites of CE 1, EX 1, EX 2, EX 3, EX 4, and EX 5a. Viscosity was measured using an AR2000 viscometer (TA Instruments, New Castle, Del.), with a 40 mm flat plate and at a constant shear rate of 1 s$^{-1}$.

COMPARATIVE EXAMPLE 2

Resin without Silica Nanoparticles

The resin of Comparative Example 2, which contains no silica nanoparticles, was prepared according to Table 3, below, using a disperser (DISPERMAT, CN-10, BYK-Gardner, Columbia, Md.).

TABLE 3

| | Control Surface Treatment: | | | |
|---|---|---|---|---|
| | n/a | n/a | n/a | n/a |
| | | Example: | | |
| Formulation (wt %): | CE 2 | CE 3 | CE 4 | CE 5 |
| Silica Nanoparticle | — | — | — | — |
| Epoxy (EPON 826) | 75.0 | 59.4 | 37.6 | 71.2 |
| Diluent (HELOXY 68) | 25.0 | 19.8 | 12.5 | 23.7 |
| Silane (TMPS) | — | — | — | — |
| Amine Curative (ETHACURE 100) | — | 20.8 | — | — |
| Anhydride Curative (LINDRIDE 36Y) | — | — | 49.8 | — |
| Dicy Curative (AMICURE CG-1200) | — | — | — | 5.0 |

COMPARATIVE EXAMPLES 3-5

Resin and Curative without Silica Nanoparticles

The resins of Comparative Examples 3-5 were prepared according to Table 3, above, using a speedmixer (Model ARV-3 Vacuum Mixer, Thinky USA, Inc., Laguna Hills, Calif.). The concentration of curative was 26.3, 99.4, and 5.3 parts per hundred resin (phr) for the amine, anhydride, and dicy curatives of Table 3, respectively. The resins with curative of these Comparative Examples were each transferred to separate aluminum trays and cured for 3 hours at 80° C. and post cured for 1 hour at 150° C.

COMPARATIVE EXAMPLE 6

Solvent-based Silica Nanocomposite

The silica nanocomposite of Comparative Example 6 was prepared by dilution of a more concentrated silica nanocomposite prepared using the solvent-based process of Comparative Example 1. The concentrated silica nanocomposite was diluted with epoxy resin (EPON 826) and reactive diluent (HELOXY 68) to yield the composition according to Table 4, below. The dilution was performed with a disperser (DISPERMAT, CN-10, BYK-Gardner, Columbia, Md.).

TABLE 4

| | Solvent-based Surface Treatment: | | | |
|---|---|---|---|---|
| | Silane | Silane | Silane | Silane |
| | | Example: | | |
| Formulation (wt %): | CE 6 | CE 7 | CE 8 | CE 9 |
| Silica Nanoparticles (NALCO 2329, 2327) | 19.9 | 16.7 | 11.1 | 19.1 |
| Epoxy (EPON 826) | 59.6 | 50.1 | 33.3 | 57.2 |
| Diluent (HELOXY 68) | 19.9 | 16.7 | 11.1 | 19.1 |
| Silane (TMPS) | 0.7 | 0.6 | 0.4 | 0.7 |
| Amine Curative (ETHACURE 100) | — | 15.8 | — | — |
| Anhydride Curative (LINDRIDE 36Y) | — | — | 44.1 | — |
| Dicy Curative (AMICURE CG-1200) | — | — | — | 4.0 |

COMPARATIVE EXAMPLES 7-9

Solvent-based Silica Nanocomposite with Curative

The silica nanocomposites with curative of Comparative Examples 7-9 were prepared using Comparative Example 6 as the base resin. The curatives were added to the silica nanocomposite with a speedmixer (Model ARV-3 Vacuum Mixer, Thinky USA, Inc., Laguna Hills, Calif.). The concentration of curative added to Comparative Example 6 was 26.3, 99.4, and 5.3 phr for the amine, anhydride, and dicy curatives of Table 4, respectively. It is noted that the curative concentration (phr) is based on the epoxy (EPON 826) and diluent (HELOXY 68) concentration in the nanocomposite only. The solvent-based silica nanocomposites with curative of these Examples were each transferred to separate aluminum trays and cured for 3 hours at 80° C. and post cured for 1 hour at 150° C.

EXAMPLE 6

Solvent-free Silica Nanocomposite

The silica nanocomposite of Example 6 was prepared according to Table 5 using the solvent-free milling process of Example 4. The TMPS silane was pre-hydrolyzed in a 2:1 silane:deionized water mixture with 0.1 weight percent acetic acid to catalyze the hydrolysis. A higher silica (TIXOSIL 68) concentration (28.6 weight percent) was milled in this example compared with previous examples. The composition of this example was milled for 5 hours and 30 minutes at a nominal temperature of 99° C. The mean and D90 particle size of the silica nanoparticles in the resulting nanocomposite were 82 and 105 nanometers, respectively.

TABLE 5

| | Solvent-free Surface Treatment: | | | | |
|---|---|---|---|---|---|
| | Silane | Silane | Silane Example: | Silane | Silane |
| Formulation (wt %): | EX 6 | EX 6a | EX 7 | EX 8 | EX 9 |
| Silica Nanoparticles (TIXOSIL 68) | 28.6 | 20.0 | 16.6 | 11.3 | 19.2 |
| Epoxy (EPON 826) | 53.5 | 57.7 | 48.0 | 32.7 | 55.5 |
| Diluent (HELOXY 68) | 13.4 | 19.2 | 16.0 | 10.9 | 18.5 |
| Silane (TMPS) | 4.5 | 3.1 | 2.6 | 1.8 | 3.0 |
| Amine Curative (ETHACURE 100) | — | 16.9 | — | — | — |
| Anhydride Curative (LINDRIDE 36Y) | — | — | — | 43.3 | — |
| Dicy Curative (AMICURE CG-1200) | — | — | — | — | 3.8 |

EXAMPLE 6a

Solvent-free Silica Nanocomposite Diluted

The silica nanocomposite of Example 6a was prepared by dilution of the milled composition of Example 6 with epoxy resin (EPON 826) and reactive diluent (HELOXY 68) to yield 20 weight percent of silica in the final solvent-free silica nanocomposite. The dilution was performed with a speedmixer (Model ARV-3 Vacuum Mixer, Thinky USA, Inc., Laguna Hills, Calif.). The final composition and viscosity are shown in Table 5, above.

EXAMPLES 7-9

Solvent-free Silica Nanocomposites with Curative

The silica nanocomposites with curative of Examples 7-9 were prepared using Example 6a as the base resin. The curatives were added to the silica nanocomposites with a speedmixer (Model ARV-3 Vacuum Mixer, Thinky USA, Inc., Laguna Hills, Calif.). The concentration of curative was 26.3, 99.4, and 5.3 phr for the amine, anhydride, and dicy curatives of Table 5, respectively. It is noted that the curative concentration (phr) is based on the epoxy (EPON 826) and diluent (HELOXY 68) concentration in the nanocomposite only. The solvent-free silica nanocomposites with curative of these examples were each transferred to separate aluminum trays and cured for 3 hours at 80° C. and post cured for 1 hour at 150° C.

Figure 2A:
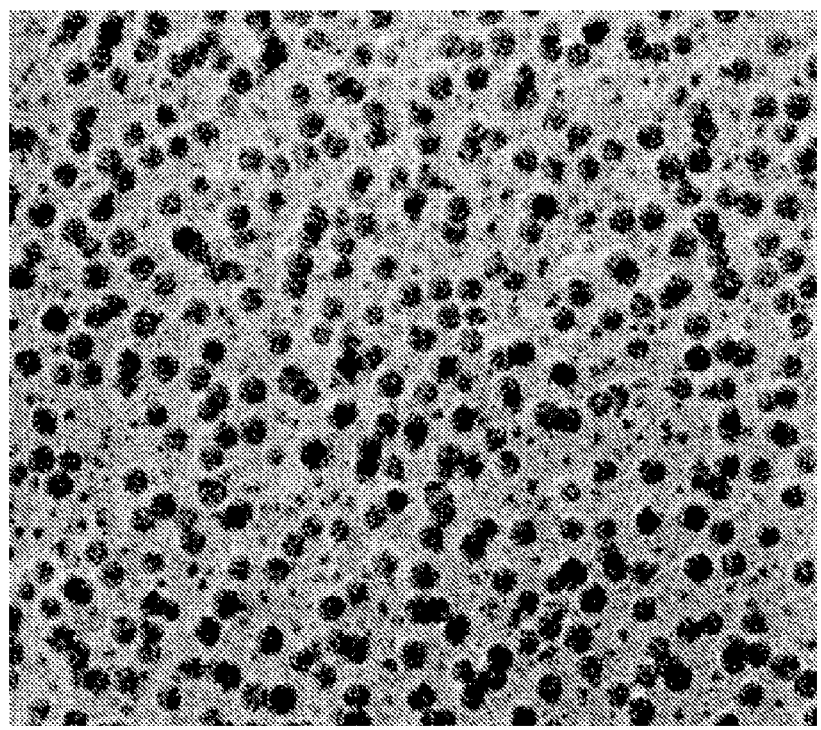
FIG. 2a is a transmission electron microscopy (TEM) image of Comparative Example 7.
Figure 2B:
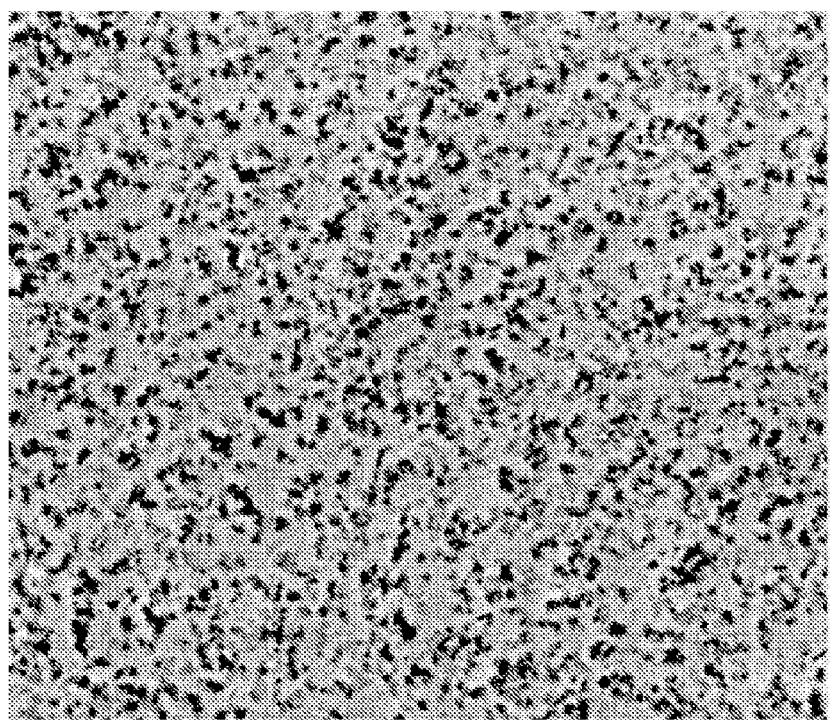
FIG. 2b is a TEM image of Example 7.
Figure 2C:
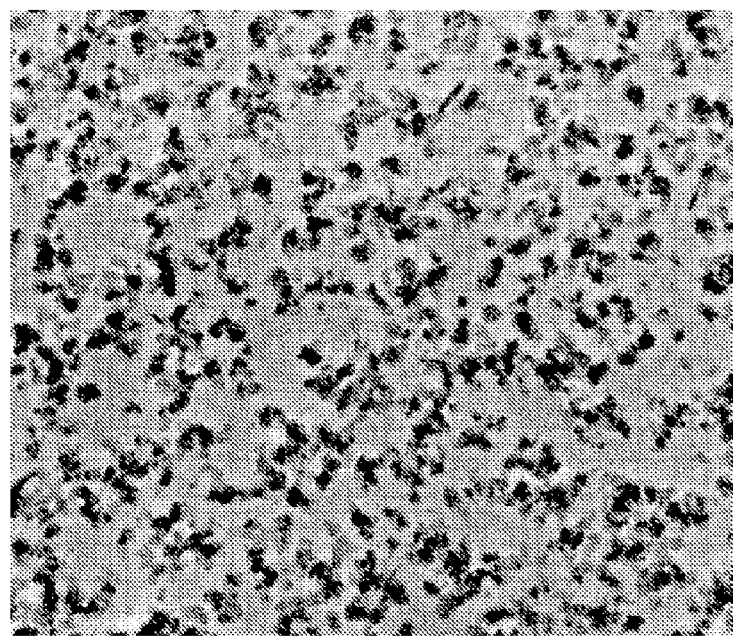
FIG. 2c is a TEM image of Example 7, having a higher magnification than the TEM image of FIG. 2b.

FIG. 2 provides transmission electron microscopy (TEM) images of Comparative Example 7 (FIG. 2a) and Example 7 (FIG. 2b and FIG. 2c). Good dispersion quality is shown in the TEM images for both solvent-based (CE 7) and solvent-free (EX 7) silica nanocomposites cured with an amine curative (ETHACURE 100). The solvent-free nanocomposites show smaller primary particle sizes and shapes that are both nonspherical and irregular, for instance relative to the solvent-based nanocomposite, in which the nanoparticles are of relatively consistent size and spherical shape.

Figure 4A:
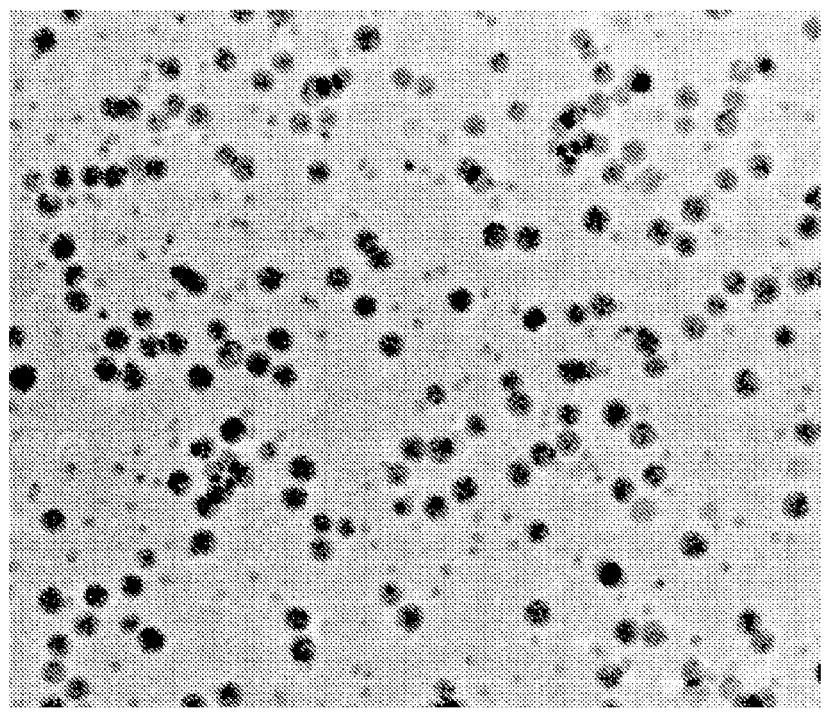
FIG. 4a is a TEM image of Comparative Example 8.
Figure 4B:
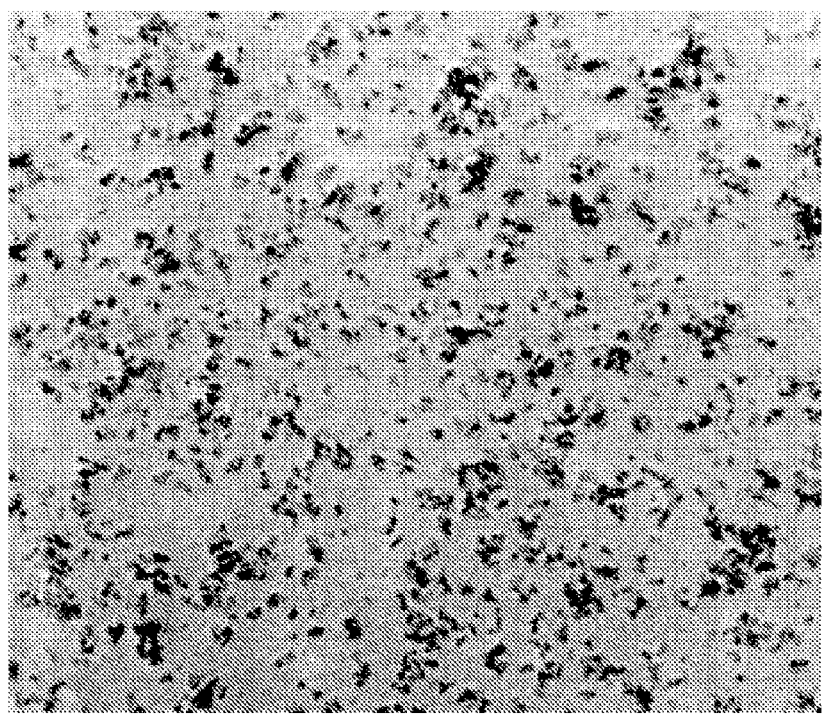
FIG. 4b is a TEM image of Example 8.

FIG. 4 provides TEM images of Comparative Example 8 (FIG. 4a) and Example 8 (FIG. 4b and FIG. 4c). Good dispersion quality is shown in the TEM images of FIG. 4 for both solvent-based (CE 8) and solvent-free (EX 8) silica nanocomposites cured with an anhydride curative (LINDRIDE 36Y). The solvent-free nanocomposites show smaller primary particle sizes and shapes that are both nonspherical and irregular, for instance relative the solvent-based nanocomposite, in which the nanoparticles are of relatively consistent size and spherical shape.

Figure 6A:
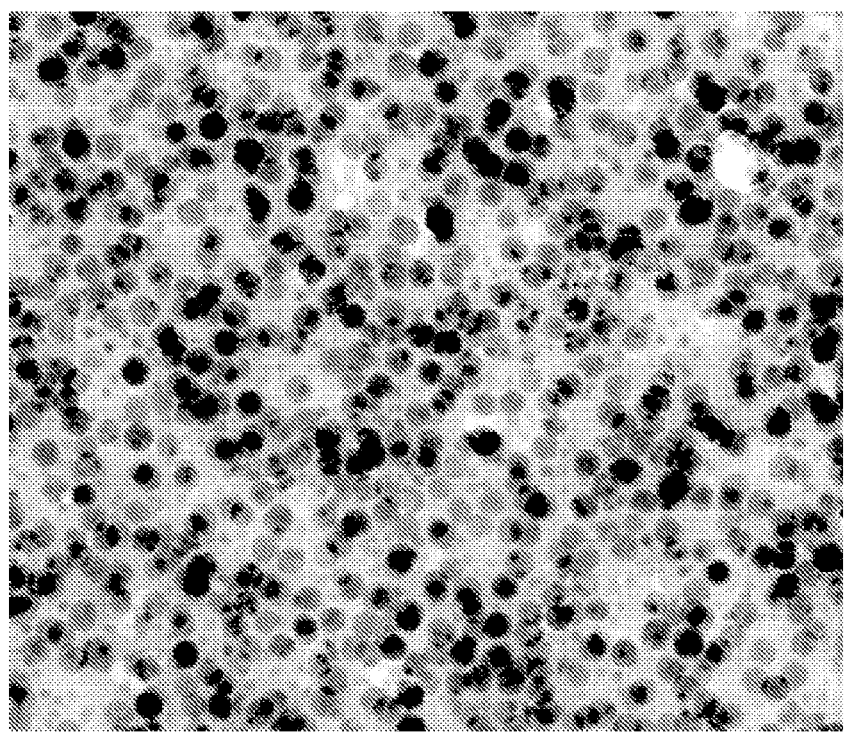
FIG. 6a is a TEM image of Comparative Example 9.
Figure 6B:
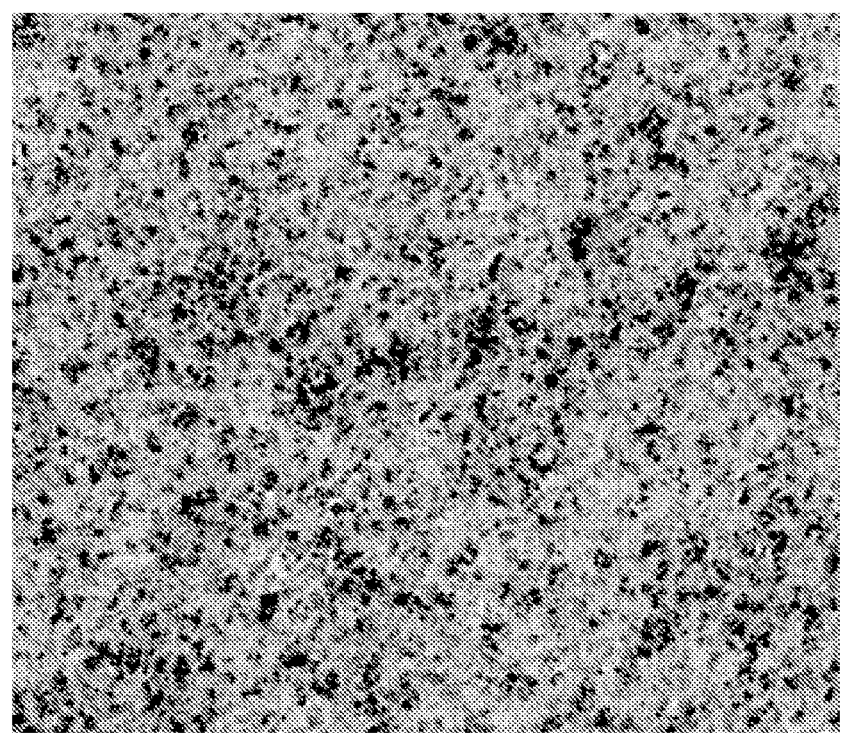
FIG. 6b is a TEM image of Example 9.
Figure 6C:
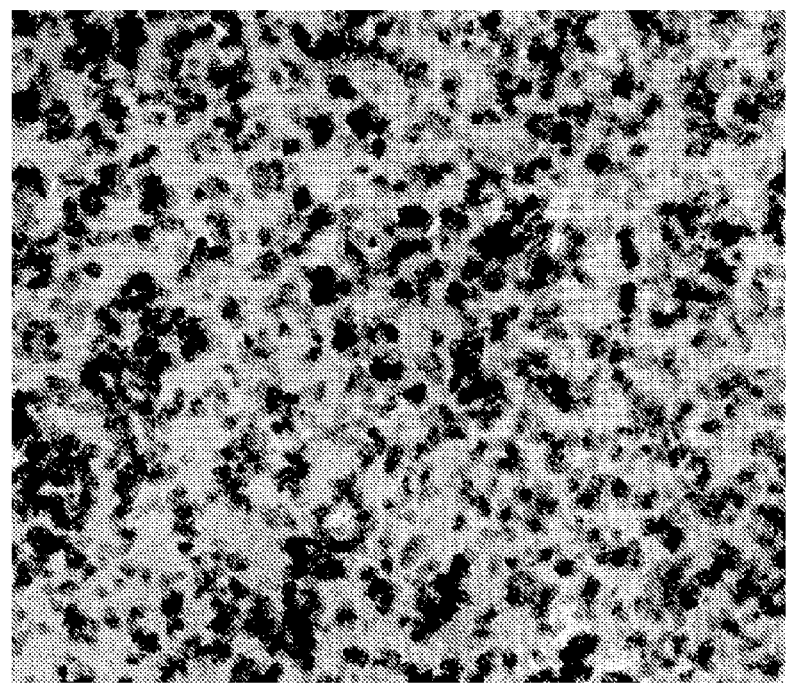
FIG. 6c is a TEM image of Example 9, having a higher magnification than the TEM image of FIG. 6b.

FIG. 6 provides TEM images of Comparative Example 9 (FIG. 6a) and Example 9 (FIG. 6b and FIG. 6c). Good dispersion quality is shown in the TEM images of FIG. 6 for both solvent-based (CE 9) and solvent-free (EX 9) silica nanocomposites cured with a dicy curative (AMICURE CG-1200). The solvent-free nanocomposites show smaller primary particle sizes and shapes that are both nonspherical and irregular shapes, for instance relative to the solvent-based nanocomposite, in which the nanoparticles are of relatively consistent size and spherical shape.

TABLE 6

| | Solvent-free Surface Treatment: | | | |
|---|---|---|---|---|
| | Dispersant | Dispersant | Dispersant Example: | Dispersant |
| Formulation (wt %): | EX 5 | EX 5a | EX 10 | EX 11 |
| Silica Nanoparticles (TIXOSIL 68) | 24.3 | 20.0 | 16.6 | 11.3 |
| Epoxy (EPON 826) | 54.7 | 58.3 | 48.6 | 33.1 |
| Diluent (HELOXY 68) | 18.2 | 19.4 | 16.2 | 11.0 |
| Dispersant (BYK W 9010) | 2.7 | 2.2 | 1.7 | 1.1 |
| Amine Curative (ETHACURE 100) | — | — | 16.9 | — |
| Anhydride Curative (LINDRIDE 36Y) | — | — | — | 43.3 |

EXAMPLES 10 and 11

Solvent-free Silica Nanocomposites with Curative

The silica nanocomposites with curative of Examples 10 and 11 were prepared using Example 5a as the base resin.

The curatives were added to the silica nanocomposites with a speedmixer (Model ARV-3 Vacuum Mixer, Thinky USA, Inc., Laguna Hills, Calif.). The concentration of curative was 26.3 and 99.4 for the amine and anhydride curatives of Table 6, respectively. It is noted that the curative concentration (phr) is based on the epoxy (EPON 826) and diluent (HELOXY 68) concentration in the nanocomposite only. The solvent-free silica nanocomposites with curative of these examples were each transferred to separate aluminum trays and cured for 3 hours at 80° C. and post cured for 1 hour at 150° C.

Figure 3:
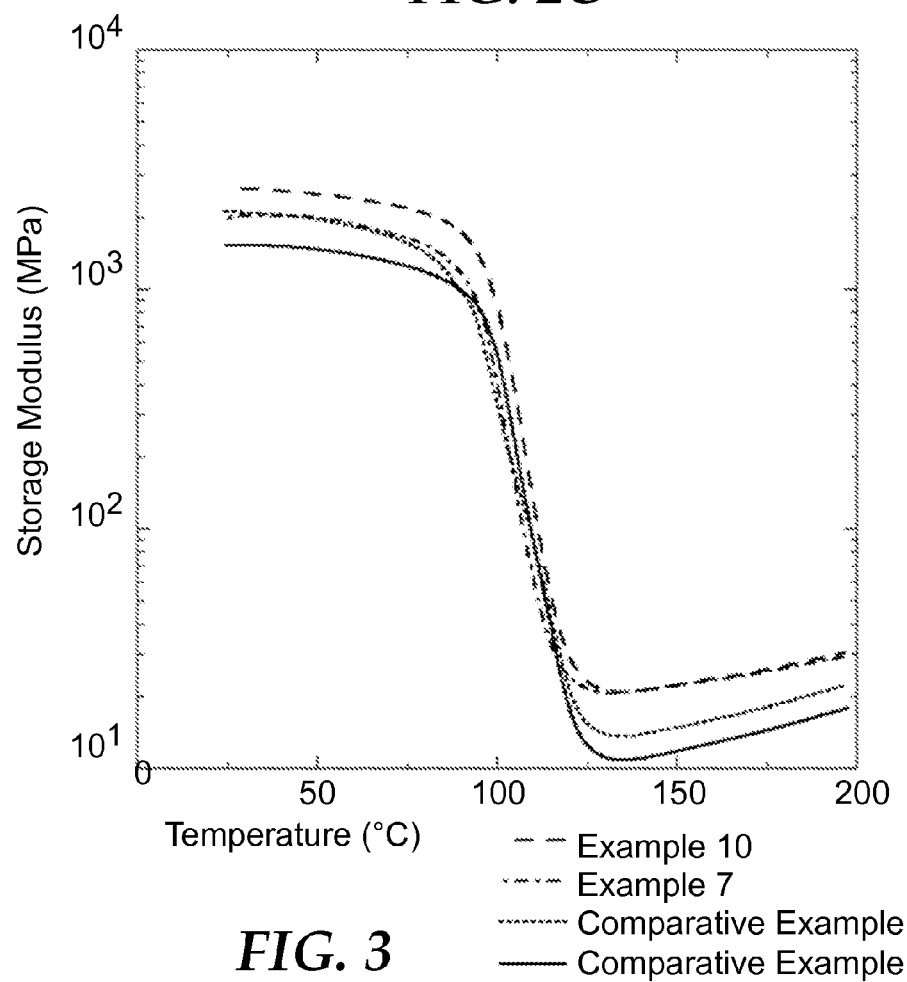
FIG. 3 is a graph presenting the storage modulus and glass transition temperature of each of Comparative Example 3, Comparative Example 7, Example 7, and Example 10.

FIG. 3 is a graph presenting the storage modulus and glass transition temperature of each of CE 3, CE 7, EX 7, and EX 10. FIG. 3 shows that both the solvent-based (CE 7) and solvent-free (EX 7) silica nanocomposites exhibit higher storage modulus relative to the cured unfilled resin (CE 3). In the glassy state (T<100° C.), the solvent-based and solvent-free nanocomposites with the silane surface treatment (EX 10) exhibit similar storage modulus, while the solvent-free nanocomposite with the dispersant exhibits the highest modulus. In the rubbery plateau region, (T>125° C.), the solvent-free nanocomposites exhibit higher modulus relative to the solvent-based nanocomposite. All four amine-cured thermosets of FIG. 3 exhibit a similar glass transition temperature of about 110° C. as defined by the inflection point between the glassy and rubbery plateau.

Figure 5:
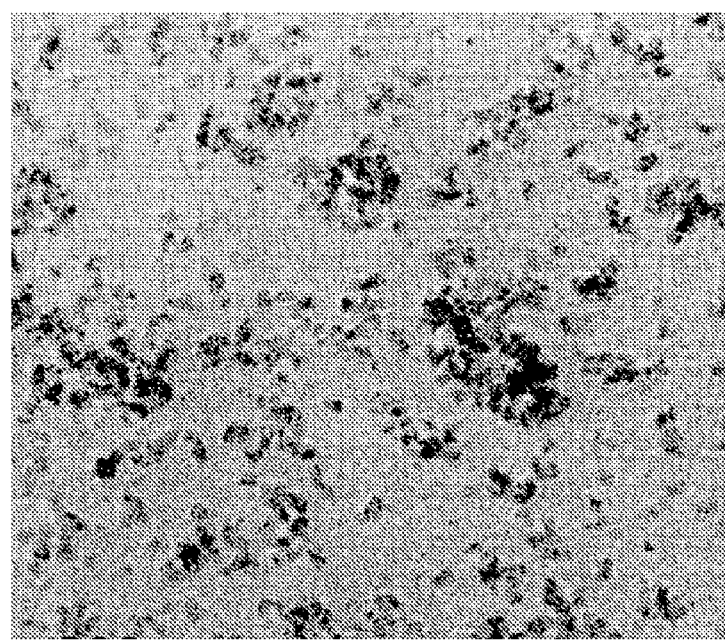
FIG. 5 is a graph presenting the storage modulus and glass transition temperature of each of Comparative Example 4, Comparative Example 8, Example 8, and Example 11.
Figure 5:
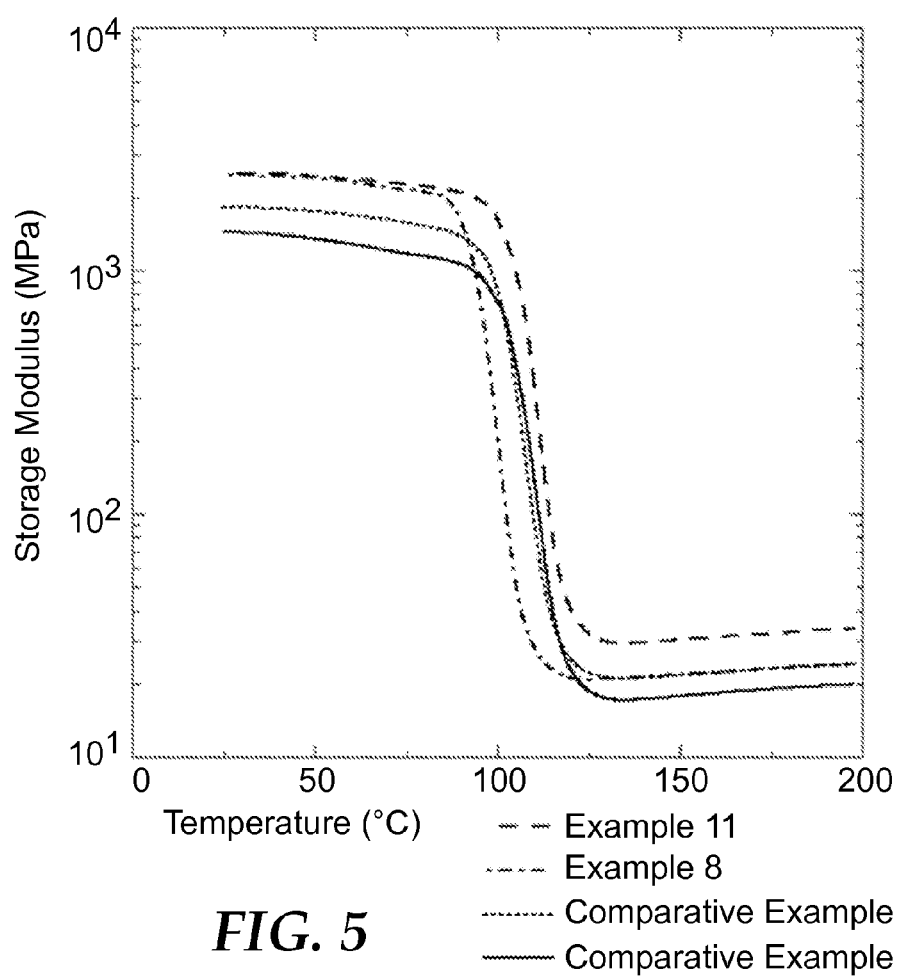

FIG. 5 is a graph presenting the storage modulus and glass transition temperature of each of CE 4, CE 8, EX 8, and EX 11. FIG. 5 shows that both the solvent-based (CE 8) and solvent-free (EX 8) silica nanocomposites exhibit higher storage modulus relative to the cured unfilled resin (CE 4). In the glassy state (T<100° C.), both solvent-free nanocomposites exhibit higher modulus relative to the solvent-based nanocomposite. In the rubbery plateau region, (T>125° C.), the solvent-free nanocomposite with the dispersant (EX 11) exhibits the highest modulus while the solvent-based and solvent-free nanocomposites with the silane treatment exhibit very similar modulus. The glass transition temperatures of the nanocomposites differ with the solvent-free nanocomposites with the dispersant and silane surface treatments exhibiting the highest and lowest glass transition temperatures, respectively.

COMPARATIVE EXAMPLE 10

Resin and Mixed Curative without Silica Nanoparticles

The resin of Comparative Example 10 was prepared according to Table 8 below, using a speedmixer (Model ARV-3 Vacuum Mixer, Thinky USA, Inc., Laguna Hills, Calif.). The mixed curative was an amine based formulation shown in Table 7, below. The concentration of curative was 31 phr. The resin with mixed curative of this example was transferred to an aluminum tray and cured for 3 hours at 80° C. and post cured for 1 hour at 150° C.

TABLE 7

| Mixed Curative | Amount (wt %) |
| --- | --- |
| Amine Curative (EPIKURE 3300) | 50.0 |
| Amine Curative (EPIKURE 3230) | 40.0 |
| Amine Curative (Polyamidoamine Polymer) | 10.0 |

COMPARATIVE EXAMPLE 11

Solvent-based Silica Nanocomposite with Resin and Mixed Curative

The silica nanocomposite of Comparative Example 11 was prepared from a more concentrated silica nanocomposite prepared using the solvent-based process of Comparative Example 1. The concentrated silica nanocomposite was diluted with epoxy resin (EPON 826), reactive diluent (HELOXY 68), and mixed curative according to Table 8 below using a speedmixer (Model ARV-3 Vacuum Mixer, Thinky USA, Inc., Laguna Hills, Calif.). The dilution and curative addition were performed with a speedmixer (Model ARV-3 Vacuum Mixer, Thinky USA, Inc., Laguna Hills, Calif.). The concentration of mixed curative is 31 phr. It is noted that the curative concentration (phr) is based on the epoxy (EPON 826) and reactive diluent (HELOXY 68) concentration in the nanocomposite only. The solvent-based silica nanocomposite with mixed curative of this example was transferred to an aluminum tray and cured for 3 hours at 80° C. and post cured for 1 hour at 150° C.

TABLE 8

| | Control | Solvent-based | Solvent-free |
| --- | --- | --- | --- |
| | | Surface Treatment: | |
| | n/a | Silane | Dispersant |
| | | Example: | |
| Formulation (wt %): | CE 10 | CE 11 | EX 12 |
| Silica Nanoparticle | — | 20.2 | 19.8 |
| Epoxy (EPON 826) | 57.2 | 45.4 | 44.6 |
| Diluent (HELOXY 68) | 19.1 | 15.0 | 14.9 |
| Silane (TMPS) | — | 0.6 | — |
| Dispersant (BYK W9010) | — | — | 2.2 |
| Mixed curative (see Table 7) | 23.7 | 18.7 | 18.4 |

EXAMPLE 12

Solvent-free Silica Nanocomposite with Resin and Mixed Curative

The silica nanocomposite of Example 12 was prepared according to Table 8, above, using the solvent-free silica nanocomposite of Example 5 as the base resin. The concentrated silica nanocomposite was diluted with epoxy (EPON 826), reactive diluent (HELOXY 68), and mixed curative according to Table 8 above using a speedmixer (Model ARV-3 Vacuum Mixer, Thinky USA, Inc., Laguna Hills, Calif.). The concentration of mixed curative is 31 phr. It is noted that the curative concentration (phr) is based on the epoxy (EPON 826) and reactive diluent (HELOXY 68) concentration in the nanocomposite only. The solvent-free silica nanocomposite with mixed curative of this example was transferred to an aluminum tray and cured for 3 hours at 80° C. and post cured for 1 hour at 150° C.

Neat resin properties were evaluated prior to composite fabrication to ensure resin quality and process viability. Properties tested are listed in Table 9 below. Neat resin viscosity analysis was conducted on a Brookfield CAP 2000+ viscometer at 25° C.

TABLE 9

|  | Control | Solvent-based Surface Treatment: | Solvent-free |
|---|---|---|---|
|  | n/a | Silane Example: | Dispersant |
|  | CE 10 | CE 11 | EX 12 |
| Viscosity (mPa-s) @ 25° C. | 699 ± (10) | 1855 ± (32) | >5000 |
| Mixed Viscosity (mPa-s) @ 25° C. | 241 ± (2) | 570 ± (8) | 2785 ± (57) |
| Density (g/mL) | 1.133 ± (0.003) | 1.256 ± (0.002) | 1.243 ± (0.002) |
| DSC Tg (° C.) | 90.41 | 90.85 | 80.73 |
| DMA Tg (° C.) | 102.37 | 103.71 | 95.78 |
| Tensile Modulus (GPa) | 3.09 ± (0.07) | 4.03 ± (0.15) | 4.35 ± (0.20) |
| Tensile Peak Stress (MPa) | 72.02 ± (0.60) | 77.04 ± (0.63) | 82.05 ± (0.42) |
| Tensile Strain @ Break (%) | 5.21 ± (0.03) | 4.05 ± (0.11) | 3.53 ± (0.25) |
| Compression Modulus (GPa) | 2.70 ± (0.02) | 3.36 ± (0.04) | 3.56 ± (0..09) |
| Compressive Peak Stress (MPa) | 96.0 ± (0.5) | 99.2 ± (0.5) | 109.0 ± (0.7) |
| Compressive Strain @ Peak Stress (%) | 7.4 ± (0.2) | 5.7 ± (0.3) | 5.1 ± (0.2) |

Figure 7:
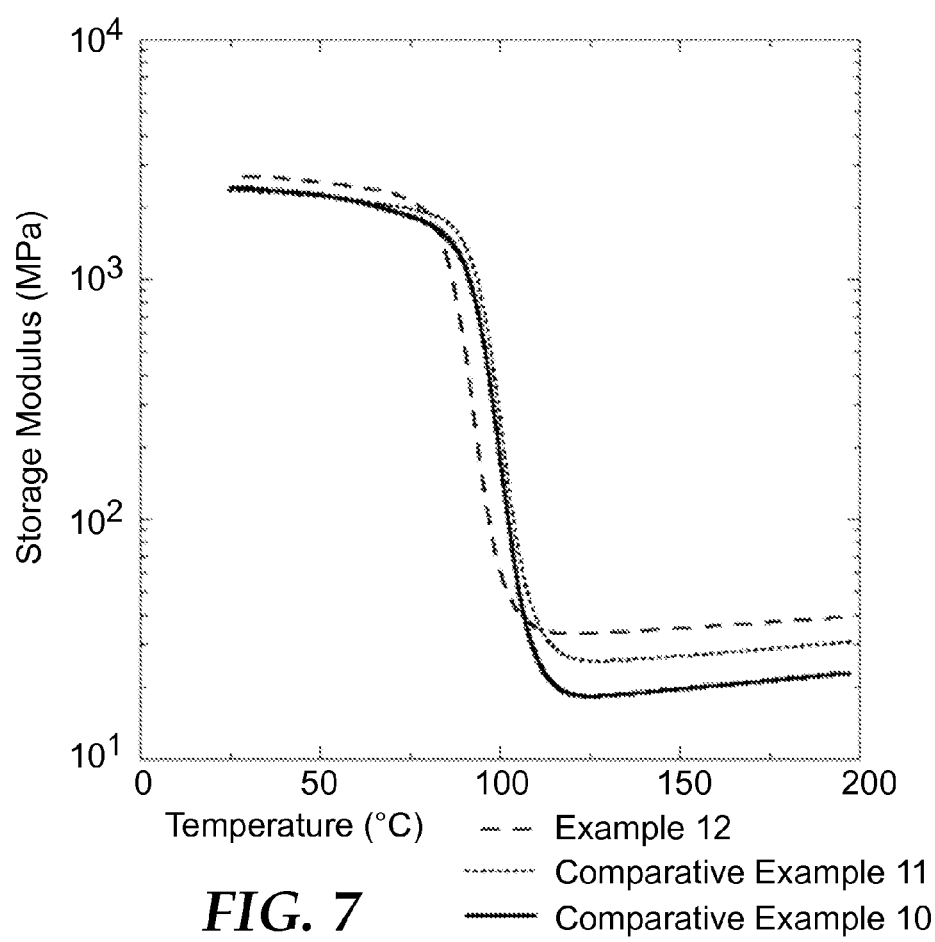
FIG. 7 is a graph presenting the storage modulus and glass transition temperature of each of Comparative Example 10, Comparative Example 11, and Example 12.

Glass transition temperature (Tg) was evaluated by differential scanning calorimetry (DSC) and dynamic mechanical analysis (DMA). FIG. 7 is a graph presenting the storage modulus and glass transition temperature of each of CE 10, CE 11, and EX 12.

COMPARATIVE EXAMPLE 12

Composite with Matrix Resin Containing No Silica Nanoparticles

The composite of Comparative Example 12 was prepared using the resin formulation of Comparative Example 10, which contains no silica nanoparticles, as the matrix resin. The composite laminate was fabricated using a vacuum assisted resin transfer molding (VARTM) technique. The fiber layup consisted of 4 layers of continuous, unidirectional, 955 grams per square meter fiberglass cloth with a uniform 0° orientation (Saertex 955, Fibre Glast Developments Corp., Brookville, Ohio). The fiber stack was evacuated and heated to 40° C. to facilitate rapid infusion of the test laminates. Laminates were infused to complete wet out and then heated to 70° C. for 2 hours before being allowed to cool slowly to ambient temperature. Upon reaching ambient temperature the samples were demolded and placed in an oven to be postcured 3 hours at 110° C. Once post curing was complete, the samples were prepped for analysis.

COMPARATIVE EXAMPLE 13

Composite with Solvent-based Silica Nanocomposite as Matrix Resin

The composite of Comparative Example 13 was prepared using the solvent-based silica nanocomposite of Comparative Example 11 as the matrix resin. The same continuous glass fiber material, VARTM and curing processes of Comparative Example 12 were used to prepare the composite of Comparative Example 13.

EXAMPLE 13

Composite with Solvent-free Silica Nanocomposite as Matrix Resin

The composite of Example 13 was prepared using the solvent-free silica nanocomposite of Example 12. The same continuous glass fiber material, VARTM and curing processes of Comparative Example 12 were used to prepare the composite of Example 13.

Properties of the composites are shown in Table 10 below. Samples were evaluated for 90° tensile analysis and the nanocomposite resins demonstrated a marked improvement versus the control. This is especially true for the solvent-free system, where improvement is clearly demonstrated in modulus, peak stress, and strain to failure.

TABLE 10

|  | Control | Solvent-based Surface Treatment | Solvent-free |
|---|---|---|---|
|  | n/a | Silane Example | Dispersant |
|  | CE 12 | CE 13 | EX 13 |
| Density (g/mL) | 1.722 ± (0.007) | 1.936 ± (0.005) | 1.974 ± (0.002) |
| 90° Tensile Modulus (GPa) | 9.98 ± (0.56) | 12.71 ± (0.47) | 14.72 ± (1.16) |
| 90° Tensile Peak Stress (MPa) | 58.50 ± (8.9) | 60.9 ± (4.2) | 75.20 ± (9.9) |
| 90° Tensile Strain @ Break (%) | 1.27 ± (0.46) | 1.34 ± (0.32) | 1.92 ± (0.38) |

Neat resin properties of the solvent-free silica nanocomposite (EX 13) show improvement over the control (CE 12) as well as over the solvent-based silica nanoparticle (CE 13) approach. Additionally, these properties translate into composite performance as suggested by the 90° tensile improvement.

EXAMPLE 14

Prophetic Example: Composite with Solvent-free Silica Nanocomposite as Matrix Resin The composite of Example 14 is prepared using the solvent-free silica nanocomposite of Example 12. An omnidirectional 458 grams per square meter chopped fiberglass strand mat (251 Continuous Strand Mat, Fibre Glast Developments Corp., Brookville, Ohio) is used as the fiber layup. The same VARTM and curing processes of Comparative Example 12 are used to prepare the composite of Example 14.

EXAMPLE 15

Solvent-free Silica Nanocomposite with Fumed Silica

The silica nanocomposite of Example 15 was prepared by the solvent-free milling process of Example 2 except the silica source was a fumed silica (ORISIL 200). ORISIL 200 has a surface area of 200 $m^2/g$. The composition milled on a weight percent basis was 80% epoxy resin (EPON 826) and 20% fumed silica (ORISIL 200). No additives were used to treat the surface of the silica. The premix was prepared in the same manner except without the aid of a scraper. A smaller immersion mill was used, Micro Mill (Hockmeyer Equipment Corporation, Elizabeth City, N.C.) equipped with 0.25 millimeter WW screen filled with 40 milliliters of 0.5 mm yttrium-stabilized zirconia milling media, 8 pegs, auger, and a turbo prop. The composition of this example was milled for 3 hours at a nominal temperature of 99° C. The mean and D90 particle size of the silica nanoparticles in the resulting nanocomposite were 90 and 100 nanometers, respectively.

EXAMPLE 16

Solvent-free Silica Nanocomposite with 4,4'-diaminodiphenyl Sulfone Curative

The silica nanocomposite of Example 16 was prepared by the process of Examples 7-9. The composition of Example 16 on a weight percent basis was 15.2% precipitated silica (TIXOSIL 68), 43.7% liquid epoxy (EPON 826), 14.5% diluent (HELOXY 68), 2.4% silane surface treatment agent (TMPS), and 24.2% curative (4,4'-diaminodiphenyl sulfone). The concentration of curative was 32.0 phr for 4,4'-diaminodiphenyl sulfone. It is noted that the curative concentration (phr) is based on the epoxy (EPON 826) and diluent (HELOXY 68) concentration in the nanocomposite only. The solvent-free silica nanocomposite with curative of this Example was transferred to an aluminum tray and cured for 3 hours at 80° C. and post cured for 1 hour at 150° C.

Figure 8:
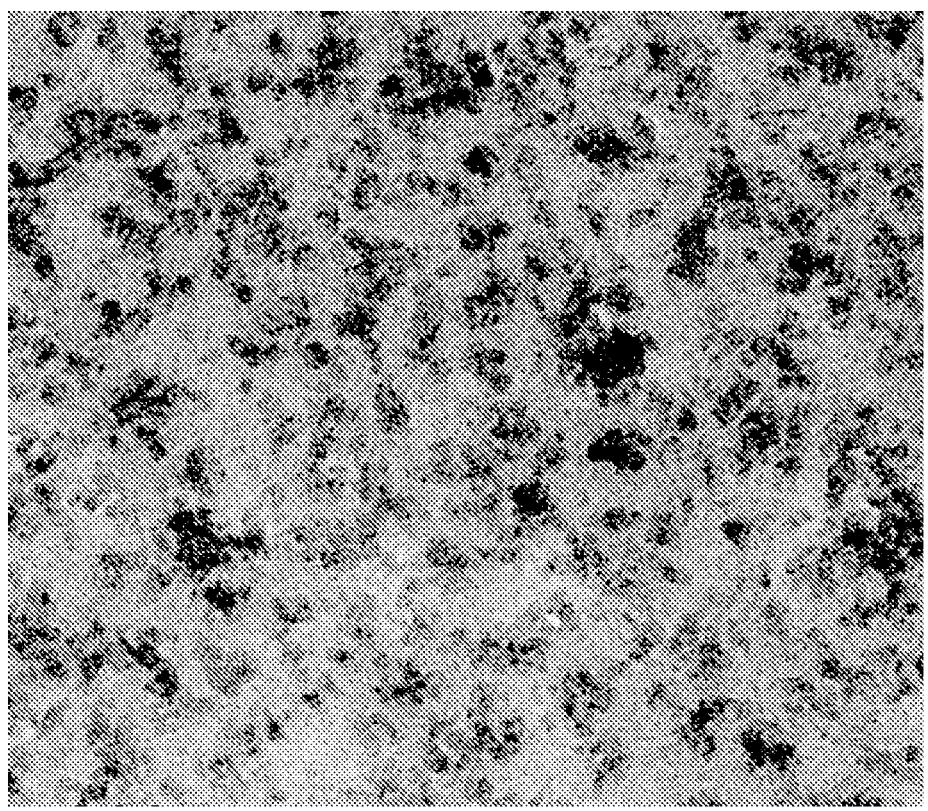
FIG. 8 is a TEM image of Example 16.

FIG. 8 provides a TEM image of Example 16. Good dispersion quality is shown in the TEM image of FIG. 8 for solvent-free silica nanocomposites cured with the 4,4'-diaminodiphenyl sulfone curative. The solvent-free nanocomposites show small primary particle sizes and shapes that are both nonspherical and irregular shapes.

EXAMPLE 17

Solvent-free Silica Nanocomposite with Solid Epoxy Resin

The silica nanocomposite of Example 17 was prepared by the solvent-free milling process of Example 3 except the epoxy resin included a solid epoxy (EPON 1001F). The composition of Example 17 on a weight percent basis was 20% precipitated silica (TIXOSIL 68), 62.4% liquid epoxy (EPON 826), 15.6% solid epoxy (EPON 1001F), and 2% dispersant (BYK W9010). The liquid epoxy (EPON 826) was not preheated for this example. The solid epoxy (EPON 1001F) was melted prior to addition to the premix. The premix was prepared in the same manner except without the aid of a scraper. A smaller immersion mill was used, Micro Mill (Hockmeyer Equipment Corporation, Elizabeth City, N.C.) equipped with 0.25 millimeter WW screen filled with 40 millilters of 0.5 mm yttrium-stabilized zirconia milling media, 8 pegs, and a turbo prop. No auger was used and the mill hardware was heated and wetted with pure epoxy (EPON 826) prior to initiation of milling. The composition of this example was milled for 5 hours at a nominal temperature of 112° C. The mean and D90 particle size of the silica nanoparticles in the resulting nanocomposite were 104 and 135 nanometers, respectively.

EXAMPLE 18

Prophetic Example: Composite with Solvent-free Silica Nanocomposite and Chopped Carbon Fiber The composite of Example 18 includes heating a viscous nanocomposite, such as that of Example 18, in a gridmelter (ITW Dynatech, Model Dynamelt S10, Henderson, Tenn.). The heated nanocomposite is fed to zone 1 of a 25 millimeter co-rotating twin screw extruder with an L/D equal to 36 (Ultraguide, Berstorff USA, Florence, Ky.). A chopped carbon fiber (Tenax—A HT C438, Toho Tenax Americas, Inc., Rockwood, Tenn.) is fed to zone 4 of the extruder using a compact microfeeder (Model KT20, K-Tron International, Inc., Pitman, N.J.). The extruder disperses the chopped carbon fiber in the solvent-free silica nanocomposite.

EXAMPLE 19

Prophetic Example: Composite with Solvent-free Silica Nanocomposite and Hollow Glass Bubbles The composite of Example 19 includes heating a viscous nanocomposite, such as that of Example 18, in a gridmelter (ITW Dynatech, Model Dynamelt S10, Henderson, Tenn.). The heated nanocomposite is fed to zone 1 of a 25 millimeter co-rotating twin screw extruder with an L/D equal to 36 (Ultraguide, Berstorff USA, Florence, Ky.). Hollow glass bubbles (iM30K, 3M Company, St. Paul, Minn.) are fed to zone 4 of the extruder using a side stuffer. The extruder disperses the hollow glass bubbles in the solvent-free silica nanocomposite.

EXAMPLE 20

Prophetic Example: Composite with Solvent-free Silica Nanocomposite, Chopped Carbon Fiber, and Hollow Glass Bubbles The composite of Example 20 includes heating a viscous nanocomposite, such as that of Example 18, in a gridmelter (ITW Dynatech, Model Dynamelt S10, Henderson, Tenn.). The heated nanocomposite is fed to zone 1 of a 25 millimeter co-rotating twin screw extruder with an L/D equal to 36 (Ultraguide, Berstorff USA, Florence, Ky.). Chopped carbon fibers (Tenax—A HT C438, Toho Tenax Americas, Inc., Rockwood, Tenn.) are fed to zone 4 of the extruder using a compact microfeeder (Model KT20, K-Tron International, Inc., Pitman, N.J.) and hollow glass bubbles (iM30K, 3M Company, St. Paul, Minn.) are fed to zone 6 of the extruder using a side stuffer. The extruder disperses the chopped carbon fiber and hollow glass bubbles in the solvent-free silica nanocomposite.

EXAMPLE 21

Prophetic Example: Pressure Vessel Containing Solvent-free Silica Nanocomposite

Example 21 is prepared by forming a silica nanocomposite according to the formulation and method of Example 12. A pressure vessel is prepared by winding carbon fiber (e.g., TORAY T700SC-12000-50C, Lot #A2106M2, Toray Carbon Fibers America, Inc., Decatur, Ala.) saturated in the silica nanocomposite, according to the coating process described in U.S. application Ser. No. 13/154,615 (Thunhorst et al.). The wound vessel is then cured according to the conditions described in U.S. application Ser. No. 13/154,615 (Thunhorst et al.) to form the pressure vessel.

EXAMPLE 22

Prophetic Example: Solvent-free Silica Nanocomposite with Dispersant

The silica nanocomposite of Example 22 is prepared according to the composition of Table 11 using the solvent-free milling process as follows: A premix is prepared with the components of the silica nanocomposite. A curing agent (LINDRIDE 36Y) is placed in a stainless steel jacketed kettle. To the kettle is added a dispersant (W9010). A 1:3 ethylene glycol:water mixture is circulated through the jacket of the kettle to control composition temperature during preparation of the premix as well as during milling. The temperature of the glycol:water mixture, and in turn, the composition is regulated by a circulator (PHOENIX II, Thermo Fisher Scientific, Newington, N.H.). The kettle containing the liquid components is secured to the frame of a disperser equipped with a 90 millimeter f-blade (DISPERMAT, CN-10, BYK-Gardner, Columbia, Md.). After activation of the f-blade, mixing of the liquid components, dry silica (TIXOSIL 68) is gradually added to the kettle.

Milling is performed using a Micro Mill immersion mill (Hockmeyer Equipment Corporation, Elizabeth City, N.C.). The immersion mill is operated with a 0.1 millimeter wire wedge screen filled with approximately 40 milliliters (65 grams) of 0.5-0.7 mm yttrium-stabilized zirconia milling media (Zirmil, Saint-Gobain, Le Pontet Cedex, France). Enclosed in the media field are 8 pegs to agitate the media. A turbo prop at the bottom exterior of the screen provided the driving force for material to circulate through the media field. No auger is used when milling.

The kettle containing the premix is transferred from the disperser station to the milling station. A nitrogen purge may be used to blanket the nanocomposite with an inert atmosphere to inhibit reaction of the curing agent. The mill is operated at between 2,000-4,000 revolutions per minute (rpm).

Milling results in size reduction of the silica particles from tens to hundreds of micrometers to about a hundred nanometers, as well as, simultaneous surface modification of the silica, and compounding of the silica nanoparticles into the curing agent. Milling is continued until no further significant reduction in silica particle size is measured.

EXAMPLE 23

Prophetic Example: Solvent-free Silica Nanocomposite with No Surface Treatment

The silica nanocomposite of Example 23 is prepared according to the composition of Table 11 using the solvent-free milling process of Example 22. No additives are used to treat the surface of the silica.

TABLE 11

| | Solvent-free Surface Treatment: | |
| --- | --- | --- |
| | Dispersant | None |
| | Example: | |
| Formulation (wt %): | EX 22 | EX 23 |
| Silica Nanoparticles (TIXOSIL 68) | 20.0 | 20.0 |
| Epoxy (EPON 826) | — | — |
| Diluent (HELOXY 107) | — | — |
| Dispersant (BYK W 9010) | 2.0 | — |
| Anhydride Curative (LINDRIDE 36Y) | 78.0 | 80.0 |
| Mill Time (hr:min) | 3:00-6:00 | 3:00-6:00 |
| Mill Temperature (° C.) | 50-100 | 50-100 |
| Particle Shape | Non-spherical | Non-spherical |

EXAMPLES 24 and 25

Prophetic Example: Solvent-free Silica Nanocomposite with Curative

The silica nanocomposites with curative of Example 24 and 25 are prepared using Examples 22 and 23 as the base resins. Epoxy (EPON 826) and reactive diluent (HELOXY 107) are added to the silica nanocomposites of Examples 22 and 23 according to the composition of Table 12 and mixed in a speedmixer (Model ARV-3 Vacuum Mixer, Thinky USA, Inc., Laguna Hills, Calif.). The solvent-free silica nanocomposites with curative are transferred to an aluminum tray and cured for 3 hours at 80° C. and post cured for 1 hour at 150° C.

TABLE 12

| | Solvent-free Surface Treatment: | |
| --- | --- | --- |
| | Dispersant | None |
| | Example: | |
| Formulation (wt %): | EX 24 | EX 25 |
| Silica Nanoparticles (TIXOSIL 68) | 10.8 | 10.7 |
| Epoxy (EPON 826) | 36.8 | 37.3 |
| Diluent (HELOXY 107) | 9.2 | 9.3 |
| Dispersant (BYK W 9010) | 1.1 | — |
| Anhydride Curative (LINDRIDE 36Y) | 42.1 | 42.7 |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A nanocomposite comprising nonspherical silica nanoparticles dispersed in a curable resin and at least one diluent comprising a mono- or poly-functional glycidyl ether or styrene, wherein the nanocomposite comprises less than 2% by weight solvent, and
   wherein the nonspherical silica nanoparticles comprise a population of clusters of primary spherical silica nanoparticles, the population of clusters having a mean size in the range of from 40 to 900 nanometers, and the primary spherical silica nanoparticles having a diameter in the range of from 1 to 100 nanometers.

2. The nanocomposite of claim 1 further comprising a dispersant comprising a copolymer comprising acidic groups.

3. The nanocomposite of claim 1 further comprising a catalyst for reacting silanol groups on the surface of the silica nanoparticles with the curable resin system.

4. The nanocomposite of claim 1 further including a surface treatment agent including an organosilane, a monohydric alcohol, a polyol, or a combination thereof.

5. The nanocomposite of claim 1 further comprising at least one additive selected from the group consisting of curing agents, cure accelerators, defoamers, air release agents, crosslinking agents, dyes, flame retardants, pigments, impact modifiers, and flow control agents.

6. The nanocomposite of claim 1 wherein the curable resin comprises an epoxy resin, a curable imide resin, a vinyl ester resin, an acrylic resin, a bisbenzocyclobutane resin, a polycyanate ester resin, or a mixture thereof.

7. The nanocomposite of claim 1 wherein the nanocomposite comprises from about 10 to about 70 weight percent of the nonspherical silica nanoparticles.

8. The nanocomposite of claim 1 further comprising a curing agent comprising an amine curing agent, an anhydride curing agent, a dicyandiamide curing agent, a diaminodiphenyl sulfone curing agent, or a combination thereof.

9. The nanocomposite of claim 1 further comprising a filler comprising at least one of reinforcing continuous fibers, reinforcing discontinuous fibers, and hollow glass bubbles, wherein the filler comprises carbon, glass, ceramic, boron, silicon carbide, basalt, ceramic, polyimide, polyamide, polyethylene, polypropylene, polyacrylnitrile, or a combination thereof.

10. A prepreg comprising the nanocomposite of claim 1.

11. A composite comprising from about 4 to 70 weight percent of nonspherical silica nanoparticles dispersed in a cured resin; at least one diluent comprising a mono- or poly-functional glycidyl ether or styrene; and a filler embedded in the cured resin, the filler comprising at least one of a reinforcing continuous fiber, reinforcing discontinuous fibers, and hollow glass bubbles, and
wherein the nonspherical silica nanoparticles comprise a population of clusters of spherical primary nanoparticles, the population of clusters having a mean size in the range of from 40 to 900 nanometers, and the primary silica nanoparticles having a diameter in the range of from 1 to 100 nanometers.

12. An article comprising from about 4 to about 70 weight percent of nonspherical silica nanoparticles dispersed in a cured resin and at least one diluent comprising a mono- or poly-functional glycidyl ether or styrene, wherein the nonspherical silica nanoparticles comprise one or more irregular shapes, and
wherein the nonspherical silica nanoparticles comprise a population of clusters of spherical primary nanoparticles, the population of clusters having a mean size in the range of from 40 to 900 nanometers, and the primary silica nanoparticles having a diameter in the range of from 1 to 100 nanometers.

13. The article of claim 12 wherein the article comprises from about 20 to about 70 weight percent of the nonspherical silica nanoparticles.

14. The article of claim 12 wherein the article comprises a turbine blade, a pressure vessel, an aerospace part, a cable, or sporting goods equipment.

15. The article of claim 14 wherein the article comprises a pressure vessel.

16. A method of preparing a nanoparticle-containing curable resin system comprising:
mixing from 10 to 70 weight percent of aggregated silica nanoparticles with a curable resin and optionally a dispersant, a catalyst, and/or a diluent, to form a mixture, wherein the mixture comprises less than 2% by weight solvent; and
milling the mixture in a first immersion mill comprising milling media to form a milled resin system comprising nonspherical silica nanoparticles dispersed in the curable resin,
wherein the nonspherical silica nanoparticles comprise a population of clusters of spherical primary nanoparticles, the population of clusters having a mean size in the range of from 40 to 900 nanometers, and the primary silica nanoparticles having a diameter in the range of from 1 to 100 nanometers.

17. A nanocomposite comprising nonspherical silica nanoparticles dispersed in a curing agent, wherein the nanocomposite comprises less than 2% by weight solvent, wherein the nanocomposite consists essentially of the nonspherical silica nanoparticles dispersed in the curing agent, and
wherein the nonspherical silica nanoparticles comprise a population of clusters of spherical primary nanoparticles, the population of clusters having a mean size in the range of from 40 to 900 nanometers, and the primary silica nanoparticles having a diameter in the range of from 1 to 100 nanometers.

* * * * *

UNITED STATES PATENT AND TRADEMARK OFFICE
CERTIFICATE OF CORRECTION

Page 1 of 1

PATENT NO. : 10,023,725 B2
APPLICATION NO. : 14/911862
DATED : July 17, 2018
INVENTOR(S) : Peter Condo It is certified that error appears in the above-identified patent and that said Letters Patent is hereby corrected as shown below:

In the Specification

Column 14,
Line 29, after "(shear-thinning)" insert -- . --.

Column 19,
Line 16, delete "for" and insert -- 1 or --, therefor.

Signed and Sealed this
Twenty-eighth Day of August, 2018

Andrei Iancu
*Director of the United States Patent and Trademark Office*